United States Patent
Zhang et al.

(10) Patent No.: US 11,824,981 B2
(45) Date of Patent: *Nov. 21, 2023

(54) DISCOVERY METHOD AND APPARATUS BASED ON SERVICE-BASED ARCHITECTURE

(71) Applicant: Huawei Technologies Co., Ltd., Shenzhen (CN)

(72) Inventors: Bo Zhang, Shenzhen (CN); Lu Gan, Shenzhen (CN); Rong Wu, Shenzhen (CN); Shuaishuai Tan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,093

(22) Filed: Mar. 16, 2022

(65) Prior Publication Data
US 2022/0278831 A1 Sep. 1, 2022

Related U.S. Application Data

(63) Continuation of application No. 16/716,044, filed on Dec. 16, 2019, now Pat. No. 11,296,877, which is a
(Continued)

(30) Foreign Application Priority Data

Aug. 31, 2017 (CN) .......................... 201710775263.3

(51) Int. Cl.
*H04L 9/08* (2006.01)
*H04L 9/32* (2006.01)
(Continued)

(52) U.S. Cl.
CPC ............ *H04L 9/088* (2013.01); *H04L 9/3247* (2013.01); *H04L 63/0435* (2013.01); *H04W 12/06* (2013.01)

(58) Field of Classification Search
CPC ......... H04L 9/088; H04L 9/3247; H04L 9/32; H04L 63/0435; H04L 63/0807;
(Continued)

(56) References Cited

U.S. PATENT DOCUMENTS

| 7,546,629 B2 | 6/2009 | Albert et al. |
| 2011/0184901 A1 | 7/2011 | Lommock et al. |

(Continued)

FOREIGN PATENT DOCUMENTS

| CN | 101517564 B | 10/2012 |
| CN | 103002442 A | 3/2013 |

(Continued)

OTHER PUBLICATIONS

3GPP TR 29.891 V0.4.0, "3rd Generation Partnership Project; Technical Specification Group Core Network and Terminals; 5G System—Phase 1; CT WG4 Aspects (Release 15)," Aug. 2017, 132 pages.

(Continued)

*Primary Examiner* — Vu V Tran
(74) *Attorney, Agent, or Firm* — Conley Rose, P.C.

(57) ABSTRACT

A discovery method and apparatus based on a service-based architecture, where the method includes a control network element sending a discovery response to a first functional network element, where the discovery response includes a determined security parameter and an access address or an identifier of a second functional network element. The first functional network element receives the discovery response from the control network element, and sends an access request to the second functional network element based on the address or the identifier of the second functional network element, where the access request includes the received security parameter. The second functional network element receives the access request from the first functional network (Continued)

element, verifies correctness of the security parameter, and determines, based on the correctness of the security parameter, whether the access request is authorized by the first functional network element.

20 Claims, 20 Drawing Sheets

Related U.S. Application Data continuation of application No. PCT/CN2018/081154, filed on Mar. 29, 2018.

(51) Int. Cl.
*H04L 9/40* (2022.01)
*H04W 12/06* (2021.01)
*H04W 88/14* (2009.01)
*H04W 8/00* (2009.01)
*H04L 67/51* (2022.01)

(58) Field of Classification Search
CPC ....... H04L 63/08; H04L 63/083; H04L 67/16; H04L 29/06; H04L 9/3242; H04L 9/0866; H04L 67/51; H04W 12/06; H04W 8/00; H04W 88/14
See application file for complete search history.

(56) References Cited

U.S. PATENT DOCUMENTS

| | | | |
|---|---|---|---|
| 2014/0310529 A1 | 10/2014 | Zong et al. | |
| 2018/0270210 A1 | 9/2018 | Gan et al. | |
| 2018/0278595 A1 | 9/2018 | Zhang et al. | |
| 2019/0253894 A1* | 8/2019 | Bykampadi | H04W 12/108 |
| 2020/0028921 A1* | 1/2020 | Cai | H04L 63/102 |
| 2020/0059767 A1* | 2/2020 | Woo | H04W 72/30 |
| 2020/0177677 A1* | 6/2020 | Yang | H04L 67/1097 |
| 2020/0367148 A1* | 11/2020 | Baek | H04W 48/18 |
| 2020/0404471 A1* | 12/2020 | Bartolomé Rodrigo | H04W 8/20 |

FOREIGN PATENT DOCUMENTS

| | | |
|---|---|---|
| CN | 103096311 A | 5/2013 |
| CN | 103428800 A | 12/2013 |
| CN | 104935426 A | 9/2015 |
| CN | 105101194 A | 11/2015 |
| CN | 105897696 A | 8/2016 |
| CN | 105933448 A | 9/2016 |
| CN | 106714152 A | 5/2017 |
| CN | 106936570 A | 7/2017 |
| EP | 2271033 B1 | 2/2016 |
| WO | 2017114123 A1 | 7/2017 |

OTHER PUBLICATIONS

3GPP TS 33.501 V0.3.0, "3rd Generation Partnership Project; Technical Specification Group Services and System Aspects; Security Architecture and Procedures for 5G System (Release 15)," Aug. 2017, 44 pages.

Huawei, et al., "A security solution for service based architecture," 3GPP Draft; S3-171875, Aug. 6, 2017, XP051310985, 2 pages.

3GPP TS 23.502 V0.5.0, Jul. 2017, "3rd Generation Partnership Project; Technical Specification Group Services and System Aspects; Procedures for the 5G System; Stage 2 (Release 15)," 148 pages.

* cited by examiner

DISCOVERY METHOD AND APPARATUS BASED ON SERVICE-BASED ARCHITECTURE

CROSS-REFERENCE TO RELATED APPLICATIONS

This application is a continuation of U.S. patent application Ser. No. 16/716,044, filed on Dec. 16, 2019, which is a continuation of International Patent Application No, PCT/CN2018/081154, filed on Mar. 29, 2018, which claims priority to Chinese Patent Application No. 201710775263.3, filed on Aug. 31, 2017. All of the patent applications are hereby incorporated by reference in their entireties.

TECHNICAL FIELD

This application relates to the field of communications technologies, and in particular, to a discovery method and apparatus based on a service-based architecture.

BACKGROUND

In the discussion of a core network architecture of a $5^{th}$ Generation (5G) network, a service-based architecture solution with a network function (NF) as a center is proposed. In the service-based architecture solution, decoupling and integration between NFs are implemented through modularization. Decoupled NFs are scaled up separately, evolved separately, and deployed on demand. In addition, all NFs on a control plane use service-based interfaces for interaction. A same service may be called by a plurality of NFs, to reduce coupling of interface definitions between NFs, and finally implement on-demand customization for functions on an entire network function, to flexibly support different service scenarios and requirements.

In the service-based architecture solution, a control network element such as a network element repository function (NRF) entity usually provides functions such as service registration, discovery, and authorization for the NFs, to implement on-demand configuration for the NFs and services and interconnection between the NFs. At a service discovery stage, in a current possible discovery method, a first NF sends a discovery request to the NRF, where the discovery request is used to request to access a second NF, or the discovery request is used to request to perform a specific service. The NRF determines an access address or an identifier of the second NF based on the received discovery request, and sends the access address or the identifier of the second NF to the first NF. The first NF accesses the second NF based on the access address or the identifier.

In the foregoing discovery method based on the service-based architecture, to ensure secure communication between the first NF and the second NF, the NRF usually generates a security key, and sends the security key to the first NF and the second NF; and the first NF and the second NF perform security authentication based on the security key. However, in this method, the NRF is required to communicate with the second NF, to implement sharing of the security key between the first NF and the second NF. This results in relatively high communication complexity.

SUMMARY

According to a discovery method and apparatus based on a service-based architecture that are provided in embodiments of this application, in a service discovery process, authentication of a security key is directly performed between a first NF and a second NF, and an NRF does not need to communicate with the second NF. This can lessen a quantity of times of communication to some extent and reduce communication complexity.

According to a first aspect, a discovery method based on a service-based architecture is provided. A control network element determines a security parameter and sends the security parameter to a first functional network element. The first functional network element receives the security parameter sent by the control network element, and sends the security parameter to a second functional network element. After receiving the security parameter sent by the first functional network element, the second functional network element verifies correctness of the security parameter, and determines, based on the correctness of the security parameter, whether an access request is authorized by the first functional network element. With this method, authentication of a security key is directly performed between the first functional network element and the second functional network element. This lessens a quantity of times of communication between the functional network element and the control network element in a discovery process to some extent, and further can reduce communication complexity to some extent.

The first functional network element is a network element that needs to access another functional network element or has a service requirement. The second functional network element is a functional network element accessed by the first functional network element, or a network element capable of providing a required service for the first functional network element.

In a possible design, the first functional network element sends a discovery request to the control network element when determining that the first functional network element needs to access another functional network element or when determining that the first functional network element needs to request to perform a service. After receiving the discovery request sent by the first functional network element, the control network element determines, based on the discovery request, an access address or an identifier of the second functional network element that satisfies a service requirement, and determines the security parameter. The control network element sends a discovery response to the first functional network element, where the discovery response includes the determined security parameter and the access address or the identifier of the second functional network element. The first functional network element receives the discovery response sent by the control network element, and sends the access request to the second functional network element based on the address or the identifier of the second functional network element included in the discovery response, where the access request includes the received security parameter. The second functional network element receives the access request sent by the first functional network element, and obtains the security parameter included in the access request. In this implementation, the second functional network element can obtain the security parameter using existing signaling. In addition, the second functional network element permits the first functional network element to access the second functional network element, when determining that the security parameter sent by the first functional network element is correct, and may refuse to let the first functional network element access the second functional network element, when determining that the security parameter sent by the first functional network element is incorrect, thereby improving communication security.

In a possible design, the security parameter includes an asymmetric first token and a first session key that is shared between the first functional network element and the second functional network element.

The control network element generates the first session key. The control network element performs a digital signature algorithm on an identifier of the first functional network element and the first session key based on a private key of the control network element, to generate a digital signature. The control network element encrypts the digital signature, the identifier of the first functional network element, the identifier of the second functional network element, and the first session key based on a public key of the second functional network element, to generate the asymmetric first token. The control network element sends, to the first functional network element, the asymmetric first token as the security parameter, and after receiving the asymmetric first token, the first functional network element sends the asymmetric first token to the second functional network element. The second functional network element receives the asymmetric first token, decrypts the asymmetric first token using a private key of the second functional network element, to obtain the digital signature, and verifies correctness of the digital signature using a public key of the control network element and signed content. The signed content includes the identifier of the first functional network element and the first session key.

Further, in addition to the identifier of the first functional network element and the first session key, a parametric value on which the control network element performs the digital signature algorithm during generation of the digital signature may further include one or more of an identifier of the control network element, a public land mobile network (PLMN) identifier (ID) of the first functional network element, a PLMN ID of the second functional network element, or a service identifier of a service requested by the first functional network element, and at least one of a signature validity period, a signature nonce, a counter, or a sequence number. The signed content is the same as the parametric value used during performing of the digital signature algorithm. In addition to the digital signature, the identifier of the first functional network element, the identifier of the second functional network element, and the first session key, a parametric value that is encrypted by the control network element during generation of the asymmetric first token may further include one or more of the identifier of the control network element, the PLMN ID of the first functional network element, the PLMN ID of the second functional network element, or the service identifier of the service requested by the first functional network element, and at least one of an asymmetric-first-token validity period, an asymmetric-first-token nonce, a counter, or a sequence number.

In another possible design, the security parameter includes a symmetric first token and a first session key that is shared between the first functional network element and the second functional network element.

The control network element generates the first session key. The control network element performs a message authentication code algorithm on an identifier of the first functional network element and the first session key based on a symmetric key shared between the control network element and the second functional network element, to generate message authentication code. The control network element encrypts the message authentication code, the identifier of the first functional network element, the identifier of the second functional network element, and the first session key based on the symmetric key shared between the control network element and the second functional network element, to generate the symmetric first token. The control network element sends, to the first functional network element, the symmetric first token as the security parameter, and after receiving the symmetric first token, the first functional network element sends the symmetric first token to the second functional network element. The second functional network element receives the symmetric first token, decrypts the symmetric first token using the symmetric key, to obtain the message authentication code, and verifies correctness of the message authentication code using the symmetric key shared between the control network element and the second functional network element and content protected by the message authentication code. The content protected by the message authentication code includes the identifier of the first functional network element and the first session key.

Further, in addition to the identifier of the first functional network element and the first session key, a parametric value on which the control network element performs the message authentication code algorithm during generation of the message authentication code may further include one or more of an identifier of the control network element, a PLMN ID of the first functional network element, a PLMN ID of the second functional network element, or a service identifier of a service requested by the first functional network element, and at least one of a message authentication code validity period, a message authentication code nonce, a counter, or a sequence number. The content protected by the message authentication code is the same as the parametric value used during performing of the message authentication code algorithm. In addition to the message authentication code, the identifier of the first functional network element, the identifier of the second functional network element, and the first session key, a parametric value that is encrypted by the control network element during generation of the symmetric first token may further include one or more of the identifier of the control network element, the PLMN ID of the first functional network element, the PLMN ID of the second functional network element, or the service identifier of the service requested by the first functional network element, and at least one of a symmetric-first-token validity period, a symmetric-first-token nonce, a counter, or a sequence number.

When the control network element generates the first session key, in a possible implementation, the first session key is randomly selected by the control network element. In another possible implementation, the first session key is generated by the control network element by performing derivation on the identifier of the first functional network element and the identifier of the second functional network element based on a derivation key. The derivation key is obtained by the control network element by performing key derivation on a preset root key. Alternatively, the derivation key is a key saved by the control network element.

Further, during generation of the first session key by the control network element, a parametric value on which derivation is performed may include one or more of the identifier of the first functional network element, the identifier of the second functional network element, the access address or the identifier of the second functional network element, the identifier of the control network element, the PLMN ID of the first functional network element, the PLMN ID of the second functional network element, the service identifier of the service requested by the first functional network element, and the like. The control network element performs derivation on the foregoing parametric value, and may also perform derivation on at least one of a first session key validity period, a first session key nonce, a counter, or a sequence number, to generate the first session key.

In still another possible design, the second functional network element decrypts the symmetric first token or the asymmetric first token to further obtain the first session key, and the second functional network element and the first functional network element may share the first session key. The second functional network element and the first functional network element may establish a security channel based on the first session key or a key derived from the first session key.

In the discovery method based on a service-based architecture provided in this embodiment of this application, the control network element generates the symmetric first token or the asymmetric first token and the first session key that is used to protect all data used for communication between the first functional network element and the second functional network element. This can implement connection-based security protection, and implement security authentication on the security parameter between the first functional network element and the second functional network element when the control network element and the second functional network element do not exchange the security parameter. This lessens a quantity of times of communication between the functional network element and the control network element in a discovery process to some extent, and further can reduce communication complexity to some extent.

In still another possible design, the security parameter includes a second session key shared between the first functional network element and the second functional network element, and an asymmetric second token generated based on each second session key.

The control network element generates the second session key that protects each service requested by the first functional network element. The control network element performs, for each service requested by the first functional network element, a digital signature algorithm on an identifier of the first functional network element and the second session key based on a private key of the control network element, to generate a digital signature. The control network element encrypts, for each service requested by the first functional network element, the digital signature, the identifier of the first functional network element, the identifier of the second functional network element, a service identifier of a service protected by the second session key, and the second session key based on a public key of the second functional network element, to generate an asymmetric second token of each service. The control network element sends, to the first functional network element, the asymmetric second token corresponding to each service as the security parameter, and after receiving the asymmetric second token corresponding to each service, the first functional network element sends an asymmetric second token corresponding to a requested service to the second functional network element based on the requested service. The second functional network element receives the asymmetric second token, decrypts the asymmetric second token using a private key of the second functional network element, to obtain the digital signature, and verifies correctness of the digital signature using a public key of the control network element and signed content. The signed content includes the identifier of the first functional network element and the second session key.

Further, in addition to the identifier of the first functional network element and the second session key, a parametric value on which the control network element performs the digital signature algorithm during generation of the digital signature may further include one or more of an identifier of the control network element, a PLMN ID of the first functional network element, a PLMN ID of the second functional network element, or a service identifier of a service requested by the first functional network element, and at least one of a signature validity period, a signature nonce, a counter, or a sequence number. The signed content is the same as the parametric value used during performing of the digital signature algorithm. In addition to the digital signature, the identifier of the first functional network element, the identifier of the second functional network element, and the second session key, a parametric value that is encrypted by the control network element during generation of the asymmetric second token may further include one or more of the identifier of the control network element, the PLMN ID of the first functional network element, the PLMN ID of the second functional network element, or the service identifier of the service requested by the first functional network element, and at least one of an asymmetric-second-token validity period, an asymmetric-second-token nonce, a counter, or a sequence number.

In still another possible design, the security parameter includes a second session key shared between the first functional network element and the second functional network element, and a symmetric second token generated based on each second session key.

The control network element generates the second session key that protects each service requested by the first functional network element. The control network element performs, for each service requested by the first functional network element, a message authentication code algorithm on an identifier of the first functional network element and the second session key based on a symmetric key shared between the control network element and the second functional network element, to generate message authentication code. The control network element encrypts the message authentication code, the identifier of the first functional network element, the identifier of the second functional network element, a service identifier of a service protected by the second session key, and the second session key based on the symmetric key shared between the control network element and the second functional network element, to generate a symmetric second token for each service requested by the first functional network element. The control network element sends, to the first functional network element, the symmetric second token as the security parameter, and after receiving the symmetric second token, the first functional network element sends the symmetric second token to the second functional network element. The second functional network element receives the symmetric second token, decrypts the symmetric second token using the symmetric key shared between the control network element and the second functional network element, to obtain the message authentication code, and verifies correctness of the message authentication code using the symmetric key shared between the control network element and the second functional network element and content protected by the message authentication code. The content protected by the message authentication code includes the identifier of the first functional network element and the second session key.

Further, in addition to the identifier of the first functional network element and the second session key, a parametric value on which the control network element performs the message authentication code algorithm during generation of the message authentication code may further include one or more of an identifier of the control network element, a PLMN ID of the first functional network element, a PLMN ID of the second functional network element, or a service identifier of a service requested by the first functional network element, and at least one of a message authentication code validity period, a message authentication code nonce, a counter, or a sequence number. The content protected by the message authentication code is the same as the parametric value used during performing of the message authentication code algorithm. In addition to the message authentication code, the identifier of the first functional network element, the identifier of the second functional network element, and the second session key, a parametric value that is encrypted by the control network element during generation of the symmetric second token may further include one or more of the identifier of the control network element, the PLMN ID of the first functional network element, the PLMN ID of the second functional network element, or the service identifier of the service requested by the first functional network element, and at least one of a symmetric-second-token validity period, a symmetric-second-token nonce, a counter, or a sequence number.

In the discovery method based on a service-based architecture provided in this embodiment of this application, the control network element generates the second session key and the second token for each service requested by the first functional network element. This can implement service-based security protection, and implement security authentication on the security parameter between the first functional network element and the second functional network element when the control network element and the second functional network element do not exchange the security parameter. This lessens a quantity of times of communication between the functional network element and the control network element in a discovery process to some extent, and further can reduce communication complexity to some extent.

In still another possible design, the security parameter includes a second session key shared between the first functional network element and the second functional network element, and an asymmetric third token generated based on all second session keys.

The control network element generates the second session key that protects each service requested by the first functional network element. The control network element performs a digital signature algorithm on an identifier of the first functional network element and all the second session keys based on a private key of the control network element, to generate a digital signature. The control network element encrypts the digital signature, the identifier of the first functional network element, the identifier of the second functional network element, service identifiers of services protected by all the second session keys, and all the second session keys based on a public key of the second functional network element, to generate an asymmetric third token of the services. The control network element sends, to the first functional network element, the asymmetric third token as the security parameter, and after receiving the asymmetric third token, the first functional network element sends the asymmetric third token to the second functional network element. The second functional network element receives the asymmetric third token, decrypts the third token using a private key of the second functional network element, to obtain the digital signature, and verifies correctness of the digital signature using a public key of the control network element and signed content. The signed content includes the identifier of the first functional network element and all the second session keys.

Further, in addition to the identifier of the first functional network element and all the second session keys, a parametric value on which the control network element performs the digital signature algorithm during generation of the digital signature may further include one or more of an identifier of the control network element, a PLMN ID of the first functional network element, a PLMN ID of the second functional network element, or a service identifier of a service requested by the first functional network element, and at least one of a signature validity period, a signature nonce, a counter, or a sequence number. The signed content is the same as the parametric value used during performing of the digital signature algorithm. In addition to the digital signature, the identifier of the first functional network element, the identifier of the second functional network element, and all the second session keys, a parametric value that is encrypted by the control network element during generation of the asymmetric third token may further include one or more of the identifier of the control network element, the PLMN ID of the first functional network element, the PLMN ID of the second functional network element, or the service identifier of the service requested by the first functional network element, and at least one of an asymmetric-third-token validity period, an asymmetric-third-token nonce, a counter, or a sequence number.

In still another possible design, the security parameter includes a second session key shared between the first functional network element and the second functional network element, and a symmetric third token generated based on all second session keys.

The control network element generates the second session key that protects each service requested by the first functional network element. The control network element performs a message authentication code algorithm on an identifier of the first functional network element and all the second session keys based on a symmetric key shared between the control network element and the second functional network element, to generate message authentication code. The control network element encrypts the message authentication code, the identifier of the first functional network element, the identifier of the second functional network element, service identifiers of services protected by all the second session keys, and all the second session keys based on the symmetric key shared between the control network element and the second functional network element, to generate the symmetric third token. The control network element sends, to the first functional network element, the symmetric third token as the security parameter, and after receiving the symmetric third token, the first functional network element sends the symmetric third token to the second functional network element. The second functional network element receives the symmetric third token, decrypts the symmetric third token using the symmetric key shared between the control network element and the second functional network element, to obtain the message authentication code, and verifies correctness of the message authentication code using the symmetric key shared between the control network element and the second functional network element and content protected by the message authentication code. The content protected by the message authentication code includes the identifier of the first functional network element and all the second session keys.

Further, in addition to the identifier of the first functional network element and all the second session keys, a parametric value on which the control network element performs the message authentication code algorithm during generation of the message authentication code may further include one or more of an identifier of the control network element, a PLMN ID of the first functional network element, a PLMN ID of the second functional network element, or a service identifier of a service requested by the first functional network element, and at least one of a message authentication code validity period, a message authentication code nonce, a counter, or a sequence number. The content protected by the message authentication code is the same as the parametric value used during performing of the message authentication code algorithm. In addition to the message authentication code, the identifier of the first functional network element, the identifier of the second functional network element, and all the second session keys, a parametric value that is encrypted by the control network element during generation of the symmetric third token may further include one or more of the identifier of the control network element, the PLMN ID of the first functional network element, the PLMN ID of the second functional network element, or the service identifier of the service requested by the first functional network element, and at least one of a symmetric-third-token validity period, a symmetric-third-token nonce, a counter, or a sequence number.

When the control network element generates the second session key for each service requested by the first functional network element, in a possible implementation, the second session key is randomly selected by the control network element. In another possible implementation, the second session key is generated by the control network element by performing derivation on the identifier of the first functional network element and the identifier of the second functional network element based on a derivation key. The derivation key is obtained by the control network element by performing key derivation on a preset root key, or the derivation key is a key saved by the control network element.

Further, during generation of the second session key by the control network element, a parametric value on which derivation is performed may include one or more of the identifier of the first functional network element, the identifier of the second functional network element, the access address or the identifier of the second functional network element, the identifier of the control network element, the PLMN ID of the first functional network element, the PLMN ID of the second functional network element, the service identifier of the service requested by the first functional network element, and the like. The control network element performs derivation on the foregoing parametric value, and may also perform derivation on at least one of a second session key validity period, a second session key nonce, a counter, or a sequence number, to generate the second session key.

In the discovery method based on a service-based architecture provided in this embodiment of this application, the control network element generates the second session key for each service requested by the first functional network element, and adds all the second session keys to one third token. This can implement service-based security protection, and sending one token to the second functional network element can reduce communication complexity.

In still another possible design, the second functional network element decrypts the second token or the third token to further obtain the second session key, and the second functional network element and the first functional network element may share the second session key. The second functional network element and the first functional network element may establish, for the service protected by the second session key, a security channel based on the second session key or a key derived from the second session key.

In still another possible design, the security parameter includes a digital signature.

The control network element performs a digital signature algorithm on an identifier of the first functional network element based on a private key of the control network element, to generate the digital signature. The control network element sends, to the first functional network element, the generated digital signature as the security parameter. After receiving the digital signature, the first functional network element sends the digital signature to the second functional network element. The second functional network element receives the digital signature sent by the first functional network element, and verifies correctness of the digital signature using a public key of the control network element and content that is signed by the digital signature. The content signed by the digital signature includes the identifier of the first functional network element.

Further, in addition to the identifier of the first functional network element, a parametric value on which the control network element performs the digital signature algorithm during generation of the digital signature may further include one or more of an identifier of the control network element, a PLMN ID of the first functional network element, a PLMN ID of the second functional network element, or a service identifier of a service requested by the first functional network element, and at least one of a signature validity period, a signature nonce, a counter, or a sequence number. The signed content is the same as the parametric value used during performing of the digital signature algorithm.

The control network element may generate a digital signature based on each service requested by the first functional network element, to implement authorization verification at a service level.

In the discovery method based on a service-based architecture provided in this embodiment of this application, the control network element generates the digital signature, and when the control network element and the second functional network element do not exchange the security parameter, the second functional network element can perform authorization verification on the first functional network element. This lessens a quantity of times of communication between the functional network element and the control network element in a discovery process to some extent, and further can reduce communication complexity to some extent.

In still another possible design, the security parameter includes message authentication code.

The control network element performs a message authentication code algorithm on an identifier of the first functional network element based on a symmetric key shared between the control network element and the second functional network element, to generate the message authentication code. The control network element sends, to the first functional network element, the generated message authentication code as the security parameter. After receiving the message authentication code, the first functional network element sends the message authentication code to the second functional network element. The second functional network element receives the message authentication code sent by the first functional network element, and verifies correctness of the message authentication code using the symmetric key and content that is protected by the message authentication code. The content protected by the message authentication code includes the identifier of the first functional network element.

Further, in addition to the identifier of the first functional network element, a parametric value on which the control network element performs the message authentication code algorithm during generation of the message authentication code may further include one or more of an identifier of the control network element, a PLMN ID of the first functional network element, a PLMN ID of the second functional network element, or a service identifier of a service requested by the first functional network element, and at least one of a message authentication code validity period, a message authentication code nonce, a counter, or a sequence number. The content protected by the message authentication code is the same as the parametric value used during performing of the message authentication code algorithm.

The control network element may generate message authentication code based on each service requested by the first functional network element, to implement authorization verification at a service level.

In the discovery method based on a service-based architecture provided in Embodiment 4 of this application, the control network element generates the message authentication code, and when the control network element and the second functional network element do not exchange the security parameter, the second functional network element can perform authorization verification on the first functional network element. This lessens a quantity of times of communication between the functional network element and the control network element in a discovery process to some extent, and further can reduce communication complexity to some extent.

In still another possible design, when the first functional network element and the second functional network element are in a roaming scenario, the control network element includes a control network element that belongs to a first PLMN and a control network element that belongs to a second PLMN. The control network element that belongs to the first PLMN is configured to manage and control the first functional network element, and the control network element that belongs to the second PLMN is configured to manage and control the second functional network element. The control network element that belongs to the second PLMN generates a security parameter, and sends the security parameter to the control network element that belongs to the first PLMN. The control network element that belongs to the first LMN receives the security parameter sent by the control network element that belongs to the second PLMN, and sends the received security parameter to the first functional network element, and the first functional network element sends the security parameter to the second functional network element, thereby implementing security authentication of the first functional network element and the second functional network element in the roaming scenario.

A process of generating the security parameter by the control network element that belongs to the second PLMN is similar to processes of generating a security parameter in the foregoing designs. A difference lies in that in addition to the foregoing parametric value, a parametric value used during generation of the security parameter further includes an identity of the first PLMN, or an identity of the second PLMN, or an identity of the first PLMN and an identity of the second PLMN.

In still another possible design, if a service requested by the first functional network element needs to be changed, for example, in a scenario in which a requested service is to be canceled, or a requested service is to be modified, the first functional network element, the control network element, or a management network element may initiate a service change request.

In a possible implementation, when the first functional network element determines that the requested service needs to be changed, the first functional network element generates message authentication code or a digital signature, and sends a service change request to the control network element. The service change request includes the message authentication code or the digital signature that performs security protection on the service change request. The control network element receives the service change request sent by the first functional network element, and performs authorization verification on the service change request sent by the first functional network element. If determining that the received service change request is authorized by the first functional network element, the control network element may change the service that is requested to change by the service change request.

The message authentication code that performs security protection on the service change request may be generated by the first functional network element by performing a message authentication code algorithm on a service identifier changed by the service change request and an identifier of the first functional network element based on a symmetric key shared between the first functional network element and the control network element. The digital signature that performs security protection on the service change request may be generated by the first functional network element by performing a digital signature algorithm on the service identifier changed by the service change request and the identifier of the first functional network element based on a private key of the first functional network element.

If the first functional network element has accessed the second functional network element, the first functional network element may send a service change notification to the second functional network element to instruct the second functional network element to change a service.

In another possible implementation, when the control network element determines that a requested service needs to be changed, the control network element generates a message authentication code (MAC) or a digital signature, where the MAC or the digital signature may perform security protection on a service change request sent by the control network element to the first functional network element. The control network element sends the service change request to the first functional network element, where the service change request includes the MAC or the digital signature that performs security protection on the service change request. The first functional network element receives the service change request sent by the control network element, and performs authorization verification on the service change request sent by the control network element. If determining that the received service change request is authorized by the control network element, the first functional network element may change a service that is requested to change by the service change request.

The message authentication code that performs security protection on the service change request may be generated by the control network element by performing a message authentication code algorithm on a service identifier changed by the service change request and an identifier of the first functional network element based on a symmetric key shared between the first functional network element and the control network element. The digital signature that performs security protection on the service change request may be generated by the control network element by performing a digital signature algorithm on the service identifier changed by the service change request and the identifier of the first functional network element based on a private key of the control network element.

If the first functional network element has accessed the second functional network element, the first functional network element may send a service change notification to the second functional network element to instruct the second functional network element to change a service.

In still another possible implementation, when determining that a service requested by the first functional network element needs to be changed, the management network element generates MAC or a digital signature, where the MAC or the digital signature may perform security protection on a service change request sent by the management network element to the control network element. The management network element sends the service change request to the control network element, where the service change request includes the MAC or the digital signature that performs security protection on the service change request. The control network element receives the service change request sent by the management network element, and performs authorization verification on the service change request sent by the management network element.

The message authentication code that performs security protection on the service change request may be generated by the management network element by performing a message authentication code algorithm on a service identifier changed by the service change request and an identifier of the first functional network element based on a symmetric key shared between the management network element and the control network element. The digital signature that performs security protection on the service change request may be generated by the management network element by performing a digital signature algorithm on the service identifier changed by the service change request and the identifier of the first functional network element based on a private key of the management network element.

If determining that the management network element authorizes the sent service change request, the control network element sends a service change notification to the first functional network element. The first functional network element receives a first service change notification sent by the control network element, and sends a service change notification to the second functional network element when determining that the first functional network element has accessed the second functional network element, to instruct the second functional network element to change a service.

According to a second aspect, a discovery apparatus based on a service-based architecture is provided. The discovery apparatus may be applied to a control network element, and the discovery apparatus applied to the control network element has a function of implementing the control network element in any one of the first aspect and the designs of the first aspect. The function may be implemented by hardware, or may be implemented by hardware executing corresponding software. The hardware or software includes one or more modules that correspond to the foregoing function. The module may be software and/or hardware.

In a possible design, the discovery apparatus applied to the control network element includes a processing unit and a sending unit, and may further include a receiving unit. The receiving unit, the processing unit, and the sending unit may correspond to functional steps performed by the foregoing control network element. Details are not described herein again.

In another possible design, the discovery apparatus applied to the control network element includes a processor, a transceiver, and a memory. The memory is coupled to the processor, and is configured to store various software programs and/or a plurality of sets of instructions. The processor invokes the stored programs or instructions of the memory to perform functional steps performed by the foregoing control network element, and controls the transceiver to send and receive a signal.

According to a third aspect, a discovery apparatus based on a service-based architecture is provided. The discovery apparatus may be applied to a first functional network element, and the discovery apparatus applied to the first functional network element has a function of implementing the first functional network element in any one of the first aspect and the designs of the first aspect. The function may be implemented by hardware, or may be implemented by hardware executing corresponding software. The hardware or software includes one or more modules that correspond to the foregoing function. The module may be software and/or hardware.

In a possible design, the discovery apparatus applied to the first functional network element includes a receiving unit and a sending unit, and may further include a processing unit. The receiving unit, the processing unit, and the sending unit may correspond to functional steps performed by the foregoing first functional network element. Details are not described herein again.

In another possible design, the discovery apparatus applied to the first functional network element includes a processor, a transceiver, and a memory. The memory is coupled to the processor, and is configured to store various software programs and/or a plurality of sets of instructions. The processor invokes the stored programs or instructions of the memory to perform functional steps performed by the foregoing first functional network element, and controls the transceiver to send and receive a signal.

According to a fourth aspect, a discovery apparatus based on a service-based architecture is provided. The discovery apparatus may be applied to a second functional network element, and the discovery apparatus applied to the second functional network element has a function of implementing the second functional network element in any one of the first aspect and the designs of the first aspect. The function may be implemented by hardware, or may be implemented by hardware executing corresponding software. The hardware or software includes one or more modules that correspond to the foregoing function. The module may be software and/or hardware.

In a possible design, the discovery apparatus applied to the second functional network element includes a receiving unit and a processing unit. The receiving unit and the processing unit may correspond to functional steps performed by the foregoing second functional network element. Details are not described herein again.

In another possible design, the discovery apparatus applied to the second functional network element includes a processor and a transceiver. A memory is coupled to the processor, and is configured to store various software programs and/or a plurality of sets of instructions. The processor invokes the stored programs or instructions of the memory to perform functional steps performed by the foregoing second functional network element, and controls the transceiver to send and receive a signal.

According to a fifth aspect, a computer storage medium is provided. The computer storage medium stores a computer instruction. When the instruction is run on a computer, any function of the first functional network element, the second functional network element, or the control network element in any one of the first aspect and the possible designs of the first aspect can be implemented.

According to a sixth aspect, a computer program product is provided. The computer program product includes a computer program. The computer program is used to implement any function of the first functional network element, the second functional network element, or the control network element in any one of the first aspect and the possible designs of the first aspect.

According to the discovery method and apparatus based on a service-based architecture that are provided in the embodiments of this application, the control network element determines the security parameter and sends the security parameter to the first functional network element; the first functional network element receives the security parameter sent by the control network element, and sends the security parameter to the second functional network element; and after receiving the security parameter sent by the first functional network element, the second functional network element verifies the correctness of the security parameter, and determines, based on the correctness of the security parameter, whether the access request is authorized by the first functional network element. With this method, authentication of the security key is directly performed between the first functional network element and the second functional network element. This lessens the quantity of times of communication between the functional network element and the control network element in the discovery process to some extent, and further can reduce the communication complexity to some extent.

DESCRIPTION OF EMBODIMENTS

The following describes technical solutions of the embodiments in this application with reference to accompanying drawings.

Figure 1:
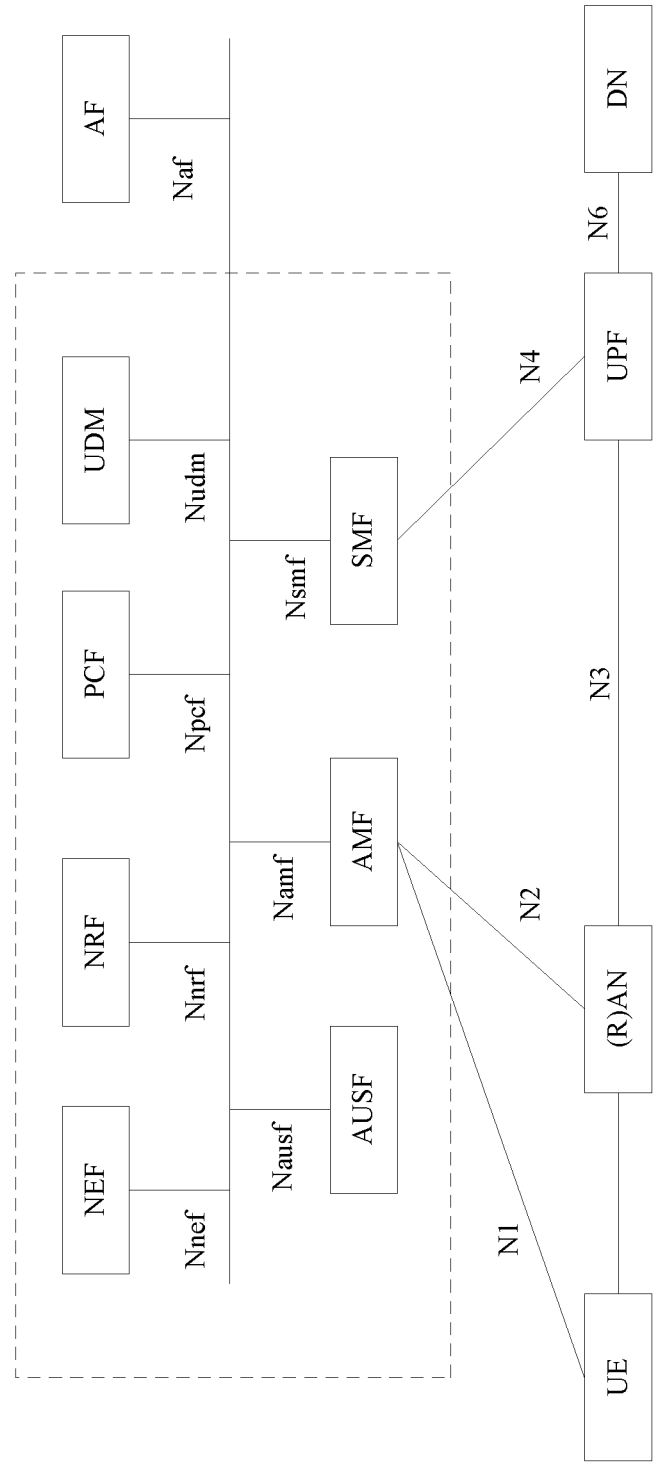
FIG. 1 is a service-based architecture in an embodiment of this application.

A registration method provided in the embodiments of this application may be applied to a service-based architecture shown in FIG. 1. In FIG. 1, in a service-based architecture on a core network control plane, decoupling and integration between NFs are implemented through modularization, and NFs use service-based interfaces for interaction. For example, in FIG. 1, NFs such as a network exposure function (NEF), an NRF, a policy control function (PCF), a unified data management (UDM), an application function (AF), an authentication server function (AUSF), an access and mobility management function (AMF), and a session management function (SMF) may interact using service-based interfaces such as a service-based interface exhibited by an NEF (Nnef), a service-based interface exhibited by an AUSF (Nausf), a service-based interface exhibited by an NRF (Nnrf), a service-based interface exhibited by an AMF (Namf), a service-based interface exhibited by a PCF (Npcf), a service-based interface exhibited by an SMF (Nsmf), a service-based interface exhibited by a UDM (Nudm), and a service-based interface exhibited by an AF (Naf), and a same service may be called by a plurality of NFs. This reduces coupling of interface definitions between the NFs, and the NFs can be customized on demand. In FIG. 1, a user equipment (UE) may access the AMF in a core network using a radio access network (RAN), or may directly access the AMF. An interface between the UE and the AMF is an N1 interface, and an interface between the RAN and the AMF is an N2 interface. The RAN may interact with a user plane function (UPF) using an N3 interface. The UPF may access the SMF in the core network using an N4 interface, and interact with the core network. The UPF may also access a data network (DN) using an N6 interface, and interact with the DN.

The network element names and interface definitions shown in FIG. 1 are quoted from definitions in a 5th generation (5G) and the 3rd generation partnership project (3GPP) draft. The figure only briefly shows interface definitions between network functional entities. In the figure, a block represents an NF definition, and a connection line represents an interface definition. For more specific definitions, refer to related definitions in the 5G 3GPP draft.

In the foregoing service-based architecture, a control network element that has a function of controlling a network element, such as the NRF may perform a function of discovering and authenticating a functional network element such as an NF. At a service discovery stage based on the service-based architecture, if a functional network element has a service requirement, and the service requirement, for example, may be a requirement of accessing another functional network element or may be a requirement of requesting to obtain a service, the functional network element that has the service requirement may send a discovery request to the control network element. After receiving the discovery request, the control network element may perform the function of discovering a functional network element, determine a functional network element that satisfies the service requirement, and send an access address or an identifier of the functional network element that satisfies the service requirement to the functional network element that sends the discovery request. The functional network element that sends the discovery request may access, based on the access address or the identifier, the functional network element determined by the control network element.

It can be understood that during performing of the discovery method based on the foregoing service-based architecture, a management network element may manage and control the functional network element.

In the embodiments of this application, for ease of description, the functional network element that has a service requirement is referred to as a first functional network element, and the functional network element that satisfies the service requirement of the first functional network element is referred to as a second functional network element.

The first functional network element and the second functional network element in the embodiments of this application may be understood as entities with a particular function. For example, the first functional network element and the second functional network element may be NFs, or may be entities such as terminals, base stations, controllers, or servers. This is not limited in the embodiments of this application. For ease of description, subsequent description uses an example in which the functional network element is an NF. A control network element in the embodiments of this application may be understood as a functional entity that owns stored registration information and that controls a network element. For example, the control network element may be an NRF, or may be an entity such as a terminal, a base station, a controller, or a server. This is not limited in the embodiments of this application. For ease of description, subsequent description uses an example in which the control network element is an NRF. A management network element in the embodiments of this application may be any functional entity that has a network element management and control function. For example, the management network element may be an entity such as an operation, administration, and maintenance (OAM) network element or a slice management network element (e.g., slice manager), or may be an entity such as a terminal, a base station, a controller, or a server. This is not limited in the embodiments of this application. For ease of description, subsequent description uses an example in which the management network element is an OAM.

In the foregoing process of discovering the second NF based on the service-based architecture, to ensure secure communication between the first NF and the second NF, the NRF usually generates a security key, and sends the security key to the first NF and the second NF; and the first NF and the second NF perform security authentication based on the security key. However, with this method, the NRF is required to communicate with the second NF, to implement security authentication performed between the first NF and the second NF based on the security key. This results in relatively high communication complexity.

In view of this, the embodiments of this application provide a discovery method based on a service-based architecture. In this method, the NRF generates a security parameter and sends the security parameter to the first NF, security authentication is performed between the first NF and the second NF based on the security parameter, and the second NF does not need to interact with the NRF. This lessens a quantity of times of communication between the NF and the NRF in a discovery process to some extent, and further can reduce communication complexity to some extent.

Figure 2:
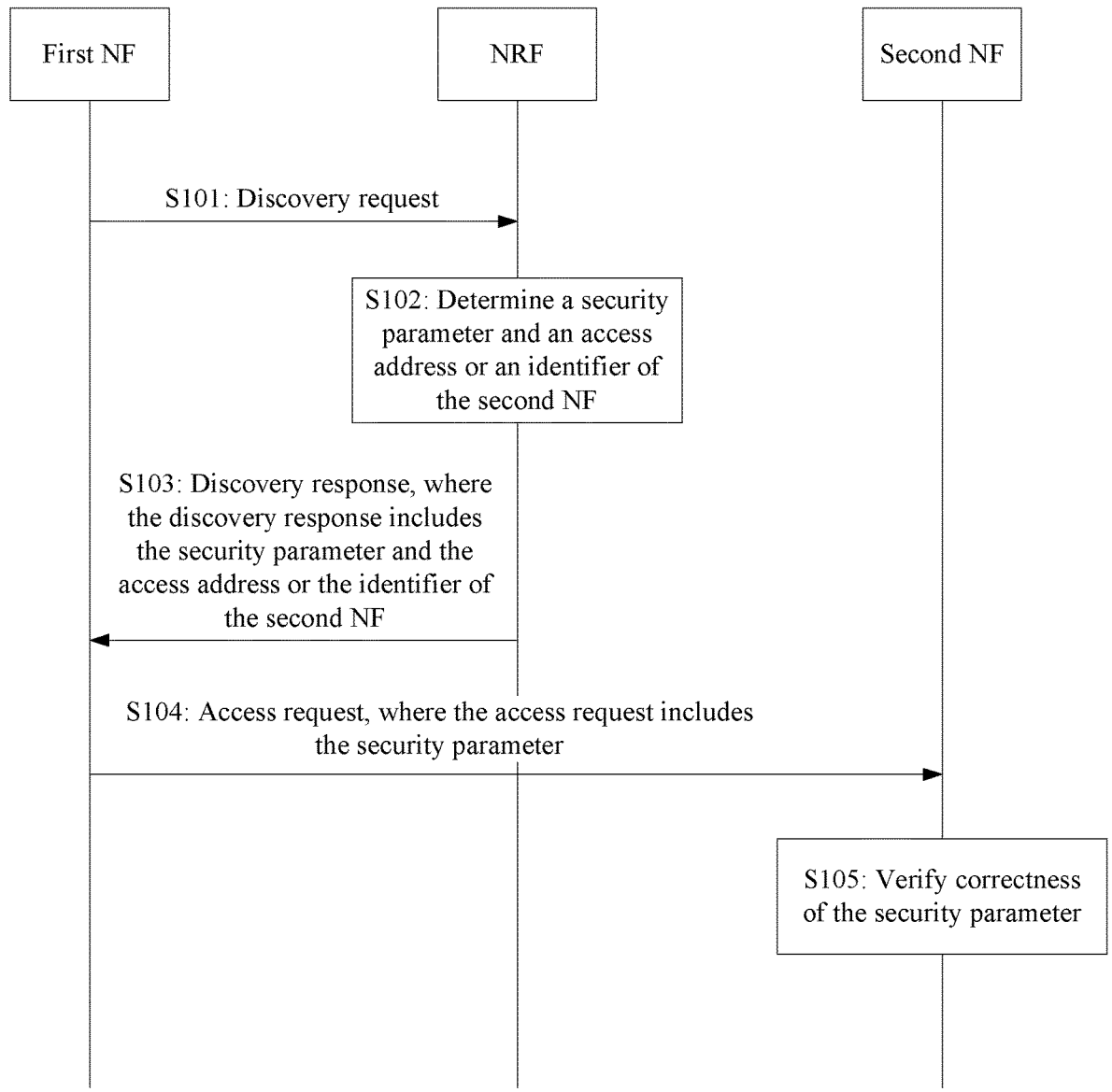
FIG. 2 is an implementation flowchart of a discovery method based on a service-based architecture according to an embodiment of this application.

FIG. 2 is an implementation flowchart of a discovery method based on a service-based architecture according to an embodiment of this application. Referring to FIG. 2, the method includes the following steps.

S101: The first NF sends a discovery request to the NRF.

In this embodiment of this application, when determining that the first NF needs to access another NF or needs to request to perform a service, the first NF sends the discovery request to the NRF. When the first NF determines that the first NF needs to access another NF, the discovery request sent by the first NF to the NRF may include type information of the NF that the first NF needs to access. When the first NF determines that the first NF needs to request to perform a specific service, the discovery request sent by the first NF to the NRF may include information such as a parameter of the service requested by the first NF.

S102: The NRF receives the discovery request sent by the first NF, and determines a security parameter and an access address or an identifier of the second NF based on the discovery request.

For example, after receiving the discovery request sent by the first NF, the NRF may determine, based on information included in the discovery request such as the NF type information and the service parameter, an NF that satisfies the service requirement. In this embodiment of this application, it is assumed that the second NF is the NF that the first NF needs to access, or may provide the service requested by the first NF, for the first NF. After determining the second NF that satisfies the service requirement, the NRF may determine parameter information of the second NF such as the access address of the second NF or the identifier of the second NF.

In this embodiment of this application, after determining the access address or the identifier of the second NF, the NRF may generate the security parameter based on the service parameter information of the service requested by the first NF and the parameter information of the second NF. The security parameter is used for security authentication between the first NF and the second NF.

Further, in this embodiment of this application, after receiving the discovery request sent by the first NF, the NRF may perform security authentication on the discovery request sent by the first NF, and when determining that the discovery request sent by the first NF is valid, perform the process of determining the access address or the identifier of the second NF and generating the security parameter, to improve security of the discovery process.

S103: The NRF sends a discovery response to the first NF, where the discovery response includes the security parameter and the access address or the identifier of the second NF.

S104: The first NF sends an access request to the second NF based on the access address or the identifier of the second NF sent by the NRF, where the access request includes the security parameter.

S105: The second NF receives the access request sent by the first NF, verifies correctness of the security parameter included in the access request, and determines, based on the correctness of the security parameter, whether to permit the first NF to access the second NF.

In this embodiment of this application, the second NF permits the first NF to access the second NF, when determining that the security parameter sent by the first NF is correct, and may refuse to let the first NF access the second NF, when determining that the security parameter sent by the first NF is incorrect.

In this embodiment of this application, the NRF generates the security parameter and sends the security parameter to the first NF, security authentication is performed between the first NF and the second NF based on the security parameter, and the second NF does not need to interact with the NRF. This lessens a quantity of times of communication between the NF and the NRF in a discovery process to some extent, and further can reduce communication complexity to some extent.

In the embodiments of this application, a generation and verification process of the security parameter and a process of implementing discovery with reference to different security parameters are described below with reference to example embodiments.

In an embodiment of this application, that the first NF needs to request a service and the second NF is capable of providing the service for the first NF is used as an example for description, and an implementation process for the first NF to request to access the second NF is similar to that. Details are not described herein again.

Embodiment 1

Figure 3A:
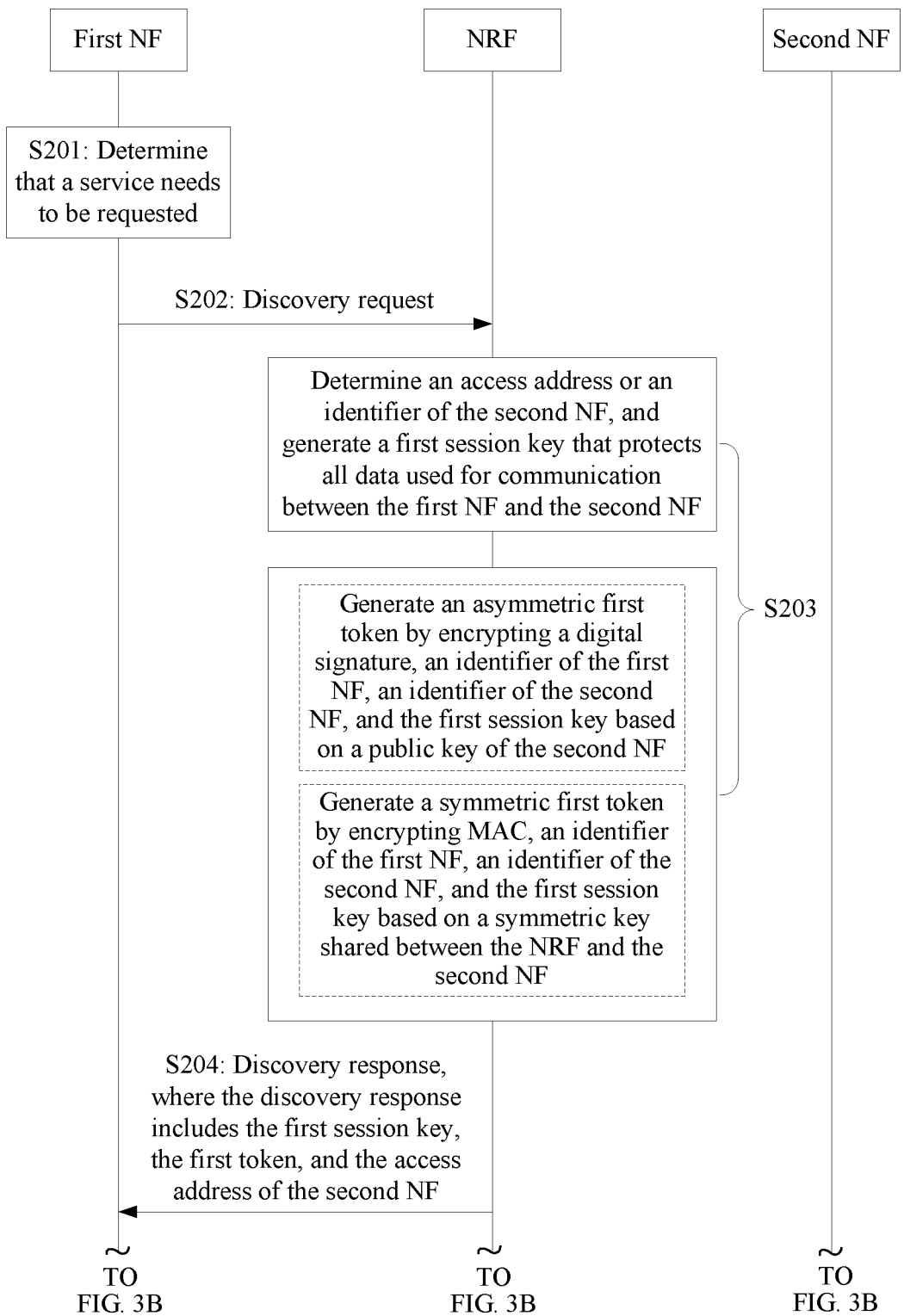
FIG. 3A and FIG. 3B are implementation flowcharts of a discovery method based on a service-based architecture according to Embodiment 1 of this application.
Figure 3B:
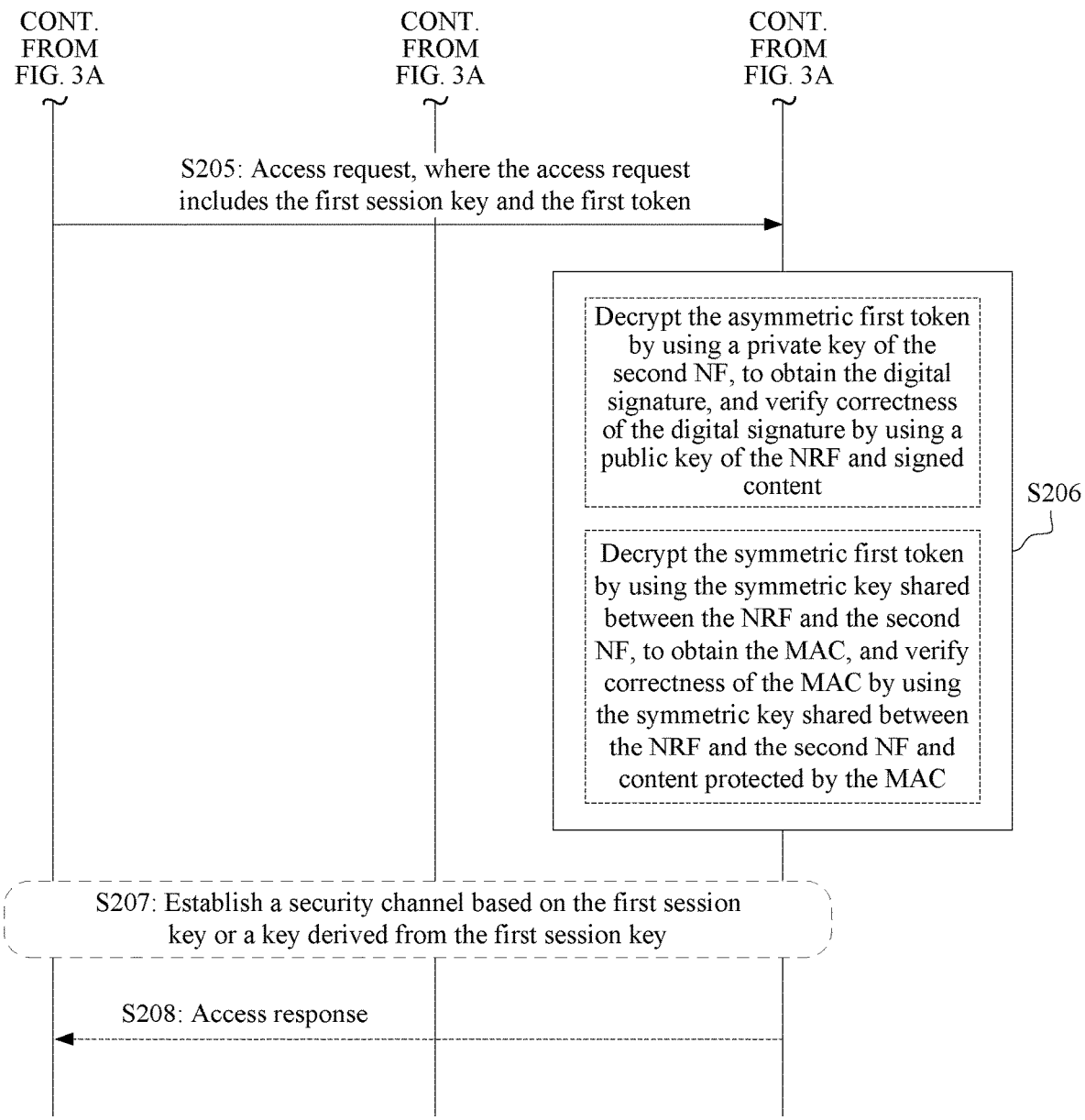

FIG. 3A and FIG. 3B are implementation flowcharts of a discovery method based on a service-based architecture according to Embodiment 1 of this application. Referring to FIG. 3A and FIG. 3B, the method includes the following steps.

S201: A first NF determines that a service needs to be requested, where the service may be determined using a service parameter, and the service parameter may be, for example, a service identity (service ID). In the following embodiment, that the service parameter is a service ID is used as an example for description, and an implementation process for another service parameter is similar to that. Details are not described herein again.

S202: The first NF sends a discovery request to an NRF, where the discovery request may include information such as an identifier of the first NF (ID_NF1) and the service ID of the service requested by the first NF, and may further include type information of a second NF (NF2 type) and the like.

The discovery request in this embodiment of this application may include service IDs of a plurality of services.

Further, the discovery request in this embodiment of this application may alternatively not include the service ID. If the discovery request does not include the service ID, the NRF may determine the service ID based on the service parameter sent by the first NF.

S203: The NRF receives the discovery request sent by the first NF, and determines an access address or an identifier of the second NF (ID_NF2) and a security parameter.

The NRF may determine the second NF based on the service ID included in the discovery request, to further determine the ID_NF2.

For example, if the discovery request includes the NF2 type, the second NF may be determined based on the NF2 type, or the ID_NF2 may be determined based on the service ID and the NF2 type. Certainly, if the discovery request in this embodiment of this application includes only the NF2 type, the NRF may alternatively determine the second NF based on the NF2 type.

In this embodiment of this application, after receiving the discovery request sent by the first NF and determining the ID_NF2, the NRF may generate a K_session based on the service ID, the ID_NF1, the ID_NF2, and the like. The generated K_session may be used to protect all data used for communication between the first NF and the second NF.

In this embodiment of this application, for ease of description, the K_session that is generated by the NRF and that is used to protect all the data used for communication between the first NF and the second NF is referred to as a first K_session.

In this embodiment of this application, the first K_session may be generated by the NRF. The first K_session may be randomly selected by the NRF. Alternatively, the first K_session may be derived by the NRF based on a derivation key. Further, during generation of the first K_session by the NRF, a parametric value on which derivation is performed includes one or more of the ID_NF1, the ID_NF2, the address of the NF2, an identifier of the NRF (ID_NRF), a public land mobile network (PLMN) identity (ID) of the first NF, a PLMN ID of the second NF, the service ID, and the like. In addition to the foregoing parametric value, the NRF may further perform derivation on at least one of a first K_session validity period (time), a first K_session nonce (nonce_session), a counter, or a sequence number, to generate the first K_session. The validity period of the first K_session may include a starting time and an ending time, or a starting time and a valid time, or an ending time. The first K_session nonce may be randomly selected by the NRF.

For example, if the first NF requests a plurality of services, in the process of generating the first K_session, the first K_session may be generated based on a plurality of service IDs.

The derivation key used for generating the first K_session may be obtained by the NRF by performing key derivation on a preset root key, or the derivation key may be a key saved by the NRF.

In this embodiment of this application, the NRF may generate a token based on the first K_session, and use the token generated based on the first K_session and the first K_session as a security parameter used for security authentication between the first NF and the second NF.

In this embodiment of this application, for ease of description, the token generated based on the first K_session is referred to as a first token.

In this embodiment of this application, in a possible implementation, the first token may be an asymmetric first token, and the asymmetric first token may be generated by the NRF based on a public key (PK) of the second NF (PKNF2). The NRF generates the asymmetric first token based on the PKNF2, and on the NRF, the PKNF2, a public key of the NRF (PKnrf), and a private key of the NRF (SKnrf) need to be pre-saved. The PKNF2 may be initially preset on the NRF, or may be sent by the second NF to the NRF during interaction between the second NF and the NRF. The NF2 also needs to pre-save the PKnrf, the PKNF2, and a private key of the second NF (SKNF2). The PKnrf may be initially preset on the second NF, or may be sent by the NRF to the NRF during interaction between the second NF and the NRF.

For example, the NRF may encrypt a digital signature, the ID_NF1, the ID_NF2, and the first K_session based on the PKNF2. The digital signature may be generated by the NRF by performing a digital signature algorithm on the ID_NF1 and the first K_session based on the SKnrf.

Further, in this embodiment of this application, in addition to the foregoing parametric values encrypted based on the PKNF2, the NRF may further encrypt one or more of the ID_NRF, the PLMN ID of the first NF, the PLMN ID of the second NF, or the service identifier of the service requested by the first NF. The NRF may further perform a signature algorithm on at least one of an asymmetric first token validity period (time), an asymmetric first token nonce (nonce_token), a counter, or a sequence number. Similarly, the digital signature may also be generated by the NRF based on the SKnrf by performing a digital signature algorithm on one or more of the ID_NRF, the PLMN ID of the first NF, the PLMN ID of the second NF, or the service identifier of the service requested by the first NF, in addition to the foregoing parametric values. The NRF may further perform a signature algorithm on at least one of a signature validity period (time), a signature nonce (nonce_sign), a counter, or a sequence number.

The first token validity period and the signature validity period may include a starting time and an ending time, or a starting time and a valid time, or an ending time. The asymmetric first token nonce and the signature nonce may be randomly selected by the NRF. The asymmetric first token nonce and the signature nonce may be the same or may be different.

In another possible implementation, the first token may be a symmetric first token. The symmetric first token may be generated by the NRF based on a symmetric key shared between the NRF and the second NF. When the NRF generates the symmetric first token based on the symmetric key shared between the NRF and the second NF, the NRF and the second NF need to pre-save the shared symmetric key.

For example, the symmetric first token may be generated by the NRF by encrypting a message authentication code (MAC), the ID_NF1, the ID_NF2, and the first K_session based on the symmetric key shared between the NRF and the second NF. The MAC is generated by the NRF by performing a message authentication code algorithm on the ID_NF1 and the first K_session based on the symmetric key shared between the NRF and the second NF.

Further, in this embodiment of this application, in addition to the foregoing parametric values encrypted based on the symmetric key shared between the NRF and the second NF, the NRF may further encrypt one or more of the ID_NRF, the PLMN ID of the first NF, the PLMN ID of the second NF, or the service identifier of the service requested by the first NF. The NRF may further perform a message authentication code algorithm on at least one of a symmetric first token validity period (time), a symmetric first token nonce (nonce_token), a counter, or a sequence number. Similarly, the MAC may also be generated by the NRF based on the SKnrf by performing a message authentication code algorithm on one or more of the ID_NRF, the PLMN ID of the first NF, the PLMN ID of the second NF, or the service identifier of the service requested by the first NF, in addition to the foregoing parametric values. The NRF may further perform a message authentication code algorithm on at least one of a MAC validity period (time), a MAC nonce (nonce_mac), a counter, or a sequence number.

The first token validity period and the MAC validity period may include a starting time and an ending time, or a starting time and a valid time, or an ending time. The symmetric first token nonce and the MAC nonce may be randomly selected by the NRF. The symmetric first token nonce and the MAC nonce may be the same or may be different.

S204: The NRF sends a discovery response to the first NF, where the discovery response includes the first K_session and the first token, and further includes at least one of the ID_NF2 or the address of the NF2.

S205: The first NF receives the discovery response sent by the NRF, and sends an access request to the second NF based on the ID_NF2 or the address of the NF2, where the access request includes the ID_NF1 and the first token.

S206: The second NF receives the access request sent by the first NF, and verifies correctness of the first token included in the access request.

In this embodiment of this application, if the first token is the asymmetric first token generated based on the PKNF2, the second NF decrypts the first token using the SKNF2, to obtain the digital signature, and verifies correctness of the digital signature using the PKnrf and signed content. The signed content includes the parametric values on which the digital signature algorithm is performed during generation of the first token. If verifying that the digital signature is correct, the second NF determines that the access request sent by the first NF is authorized by the NRF, and the first NF is permitted to access the second NF. If verifying that the digital signature is incorrect, the second NF determines that the access request sent by the first NF is not authorized by the NRF, and the first NF is not permitted to access the second NF.

In this embodiment of this application, if the first token is a symmetric first token generated based on the symmetric key shared between the NRF and the second NF, the second NF decrypts the first token using the symmetric key shared between the NRF and the second NF, to obtain the MAC, and verifies correctness of the MAC using the symmetric key shared between the NRF and the second NF and content protected by the MAC. The content protected by the MAC includes the parametric values on which the message authentication code algorithm is performed during generation of the first token. If verifying that the MAC is correct, the second NF determines that the access request sent by the first NF is authorized by the NRF, and the first NF is permitted to access the second NF. If verifying that the MAC is incorrect, the second NF determines that the access request sent by the first NF is not authorized by the NRF, and the first NF is not permitted to access the second NF.

Further, in this embodiment of this application, the second NF decrypts the first token to further obtain the first K_session, and the second NF and the first NF may share the first K_session. The second NF may use the first K_Session to perform the following step S207. Step S207 is optional.

S207: When determining that the access request sent by the first NF is authorized by the NRF, the second NF establishes a security channel with the first NF based on the first K_session or a key derived from the first K_session.

The key derived from the first K_session may be obtained by performing a key derivation algorithm on at least one of the first K_session, a tunnel establishment counter, or a session identifier.

Still further, this embodiment of this application may further include the following step S208. Step S208 is optional.

S208: The second NF may send an access response to the first NF, to notify the first NF that whether the first NF successfully accesses the second NF.

In the discovery method based on a service-based architecture provided in Embodiment 1 of this application, the NRF generates the first token and the first K_session that is used to protect all data used for communication between the first NF and the second NF. This can implement connection-based security protection, and implement security authentication on the security parameter between the first NF and the second NF when the NRF does not exchange the security parameter with the second NF. This lessens a quantity of times of communication between the NF and the NRF to some extent, and further can reduce communication complexity to some extent.

Embodiment 2

Figure 4A:
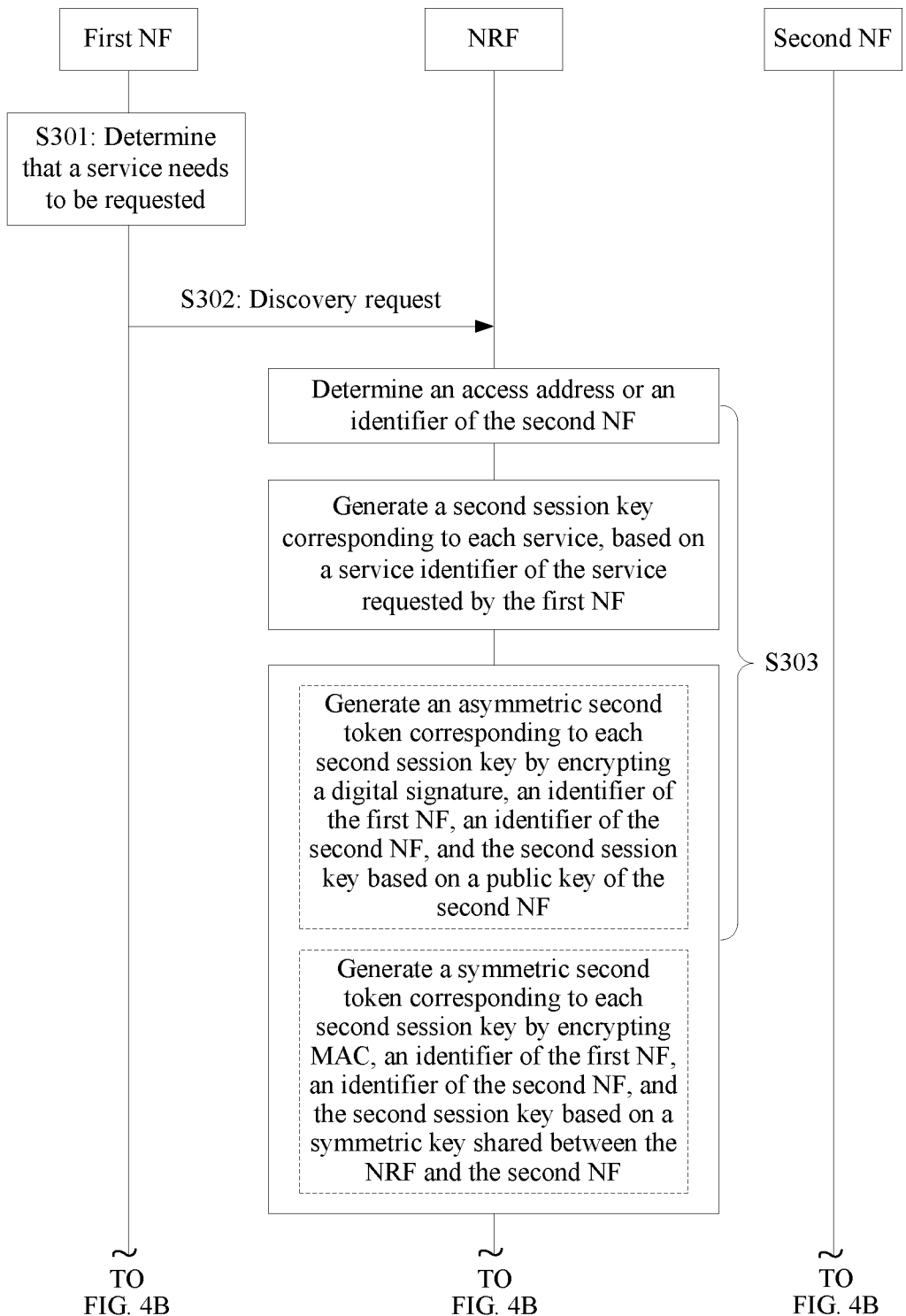
FIG. 4A and FIG. 4B are implementation flowcharts of a discovery method based on a service-based architecture according to Embodiment 2 of this application.
Figure 4B:
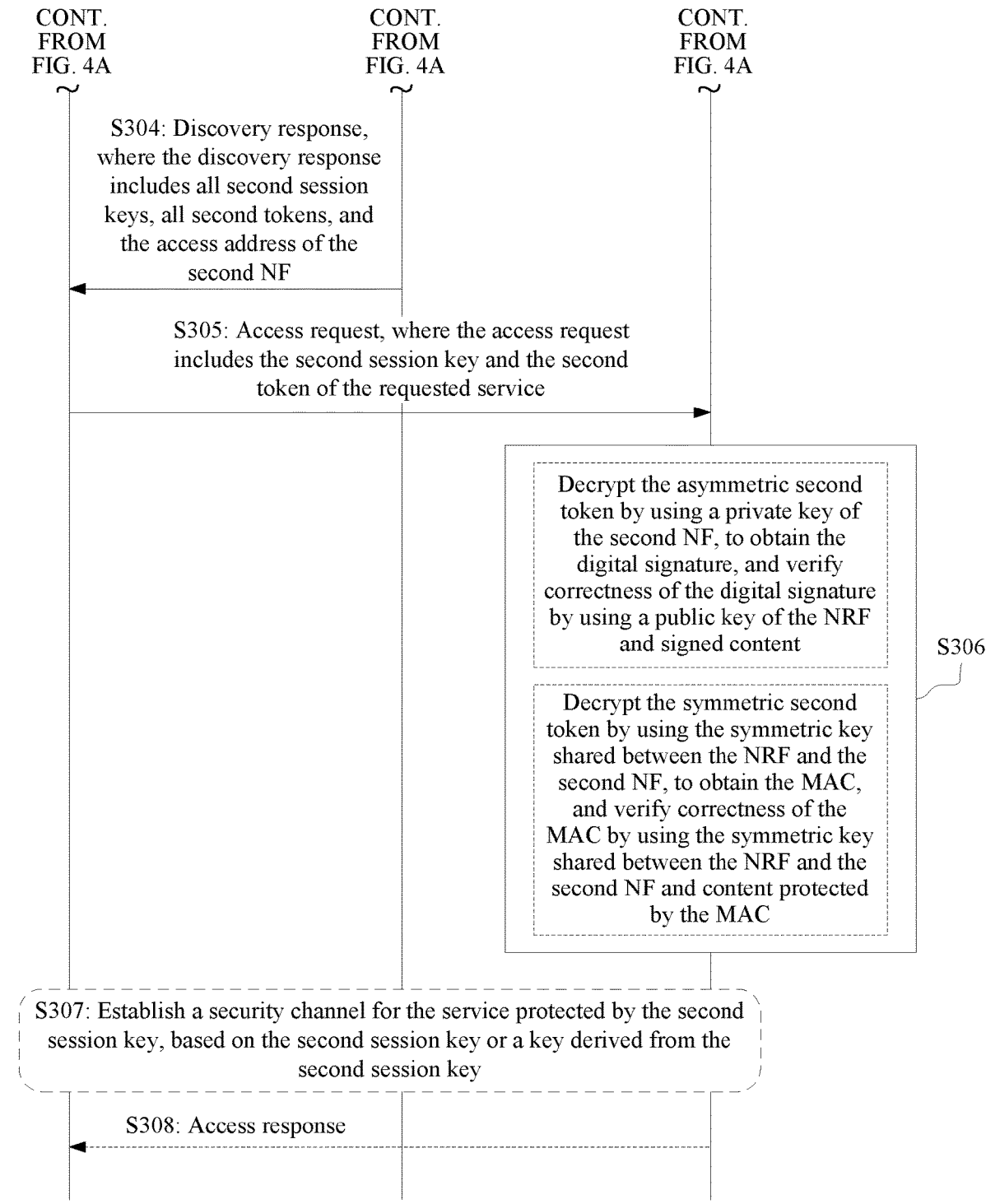

FIG. 4A and FIG. 4B are implementation flowcharts of a discovery method based on a service-based architecture according to Embodiment 2 of this application. In FIG. 4A and FIG. 4B, steps S301 and S302 are the same as steps S201 and S202 in Embodiment 1. Details are not described herein again. Only different parts are described in the following.

S303: The NRF receives the discovery request sent by the first NF, determines an access address or an identifier of the second NF (ID_NF2), and determines a security parameter.

An implementation process for the NRF to determine the ID_NF2 is similar to that in the foregoing embodiment. Details are not described herein again.

In this embodiment of this application, when determining a K_session shared between the first NF and the second NF, the NRF may generate a K_session separately for services requested by the first NF. It can be understood that there is a one-to-one correspondence between each service and a K_session, and each K_session protects a service corresponding to the K_session.

In this embodiment of this application, for ease of description, each K_session that protects each service requested by the first NF is referred to as a second K_session.

In this embodiment of this application, the NRF may generate, based on the service ID of the service requested by the first NF, a second K_session corresponding to each service.

For example, generation processes of second K_sessions are similar, and only used service IDs are different. Each K_session may be generated in the following manner.

The second K_session may be generated by the NRF. The second K_session may be randomly selected by the NRF. Alternatively, the second K_session may be generated by the NRF by performing derivation, based on a derivation key, on at least of an ID_NF1, the ID_NF2, and the service ID of the service protected by the second K_session. The derivation key used for generating the second K_session may be obtained by the NRF by performing key derivation on a preset root key, or the derivation key may be a key saved by the NRF.

For example, it is assumed that services requested by the first NF include a service 1 and a service 2, an identifier of the service 1 is a service ID1, and an identifier of the service 2 is a service ID2. In this embodiment of this application, a second K_session1 and a second K_session2 may be generated. The second K_session1 is generated based on the service ID1 and protects the service 1. The second K_session2 is generated based on the service ID2 and protects the service 2.

Further, in this embodiment of this application, the NRF may generate, based on each generated second K_session, a token corresponding to each second K_session.

In this embodiment of this application, for ease of description, the token that is generated based on each second K_session and that is corresponding to each second K_session is referred to as a second token.

For example, the NRF may generate a second token corresponding to each second K_session, based on each second K_session and the service ID of the service protected by the second K_session. Generation processes for second tokens are similar, and only used second K_sessions and service IDs of services protected by the second K_sessions are different. For example, it is still assumed that services requested by the first NF include a service 1 and a service 2, an identifier of the service 1 is a service ID1, an identifier of the service 2 is a service ID2, a second K_session1 is generated based on the service ID1 and protects the service 1, and a second K_session2 is generated based on the service ID2 and protects the service 2. Therefore, in this embodiment of this application, a second token1 may be generated based on the service ID1 and the second K_session1, and a second token2 is generated based on the service ID2 and the second K_session2.

Further, in this embodiment of this application, the second token may be a symmetric second token, or may be an asymmetric second token.

In a possible implementation, the NRF may encrypt a digital signature, the ID_NF1, the ID_NF2, the service ID of the service protected by the second K_session, and the second K_session based on a PKNF2, to generate an asymmetric second token. The digital signature is generated by the NRF by performing a digital signature algorithm on the ID_NF1 and the second K_session based on a private key of the NRF.

In another possible implementation, the NRF may encrypt MAC, the ID_NF1, the ID_NF2, the service ID of the service protected by the second K_session, and the second K_session based on a symmetric key shared between the NRF and the second NF, to generate a symmetric second token. The MAC is generated by the NRF by performing a message authentication code algorithm on the ID_NF1 and the second K_session based on the symmetric key shared between the NRF and the second NF.

In this embodiment of this application, for the symmetric second token or the asymmetric second token generated for each second K_session, an implementation similar to that of generating the symmetric first token or the asymmetric first token in Embodiment 1 may be used, and a difference lies in that generation herein needs to be performed based on the second K_session and the service ID of the service protected by the second K_session. Other parametric values may be similar, and therefore details are not described herein again. For details, refer to descriptions in Embodiment 1.

S304: The NRF sends a discovery response to the first NF, where the discovery response includes all second K_sessions and all second tokens, and further includes at least one of the ID_NF2 or the address of the NF2.

S305: The first NF receives the discovery response sent by the NRF, and sends an access request to the second NF based on the ID_NF2 included in the discovery response, where the access request includes the ID_NF2 and the second token. For example, if the service requested by the first NF is the service 1, the access request may include the second K_session1 and the second token1.

S306: The second NF receives the access request sent by the first NF, and verifies correctness of the second token included in the access request.

In this embodiment of this application, an implementation process for the second NF to verify the second token is similar to that of verifying the first token in Embodiment 1, and therefore details are not described herein again.

Further, in this embodiment of this application, the second NF decrypts the second token to further obtain the second K_session, and the second NF and the first NF may share the second K_Session. The second NF may use the second K_Session to perform the following step S307. Step S307 is optional.

S307: When determining that the access request sent by the first NF is authorized by the NRF, the second NF establishes, with the first NF based on the second K_session or a key derived from the second K_session, a security channel for the service protected by the second K_session.

Similarly, this embodiment of this application may also include the following step of sending an access response to the first NF:

S308: The second NF sends the access response to the first NF, to notify the first NF that whether the first NF successfully accesses the second NF.

Step S308 is optional.

In the discovery method based on a service-based architecture provided in Embodiment 2 of this application, the NRF generates the second K_session and the second token for each service requested by the first NF. This can implement service-based security protection, and implement security authentication on the security parameter between the first NF and the second NF when the NRF does not exchange the security parameter with the second NF. This lessens a quantity of times of communication between the NF and the NRF to some extent, and further can reduce communication complexity to some extent.

In another possible embodiment of this application, the NRF may generate one token for all second K_sessions, such that when the first NF requests a plurality of services, the NRF does not need to send a plurality of tokens but send one token to the second NF. This further reduces communication complexity.

In this embodiment of this application, for ease of description, the token generated based on all the second K_sessions may be referred to as a third token.

Embodiment 3

Figure 5A:
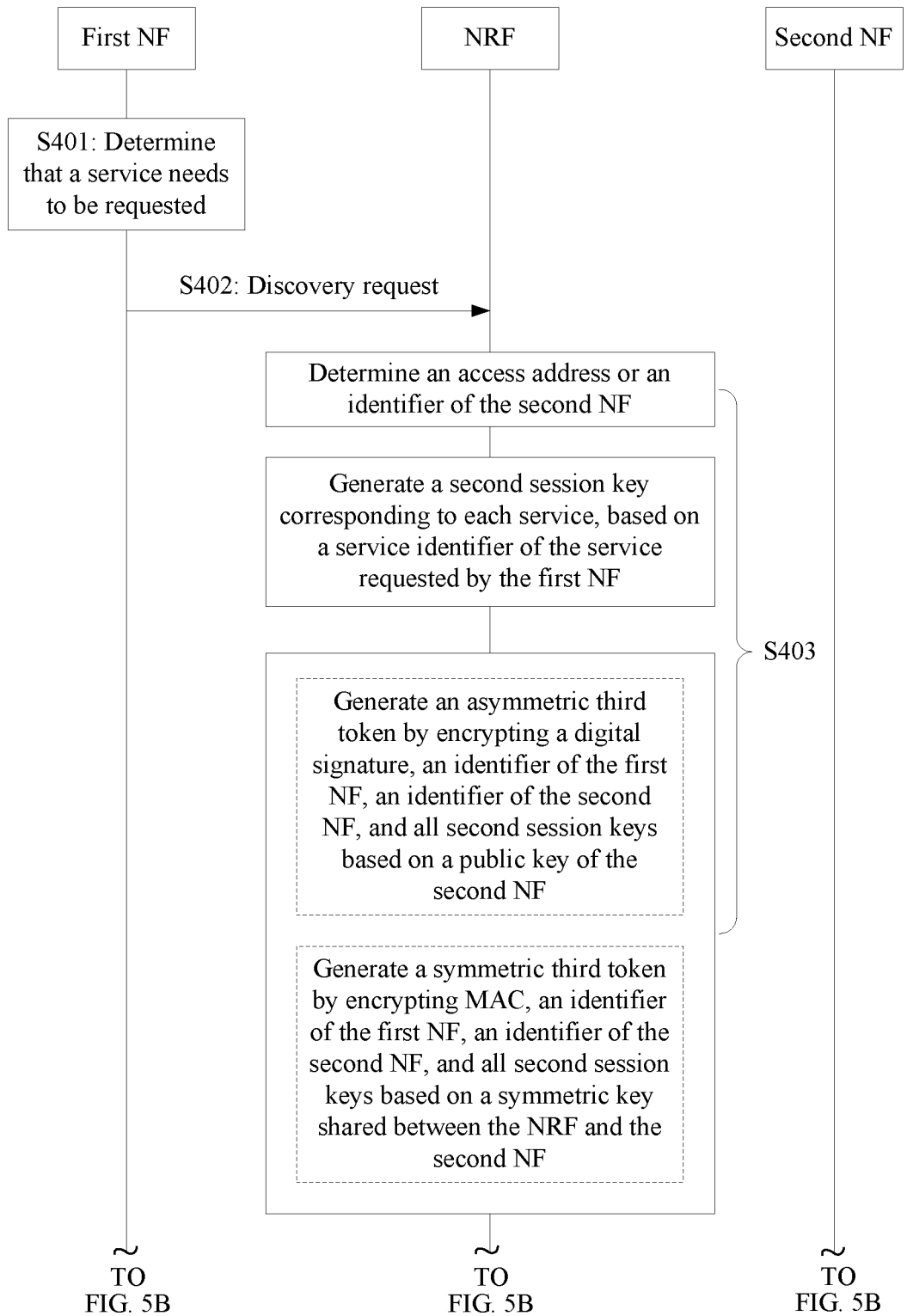
FIG. 5A and FIG. 5B are implementation flowcharts of a discovery method based on a service-based architecture according to Embodiment 3 of this application.
Figure 5B:
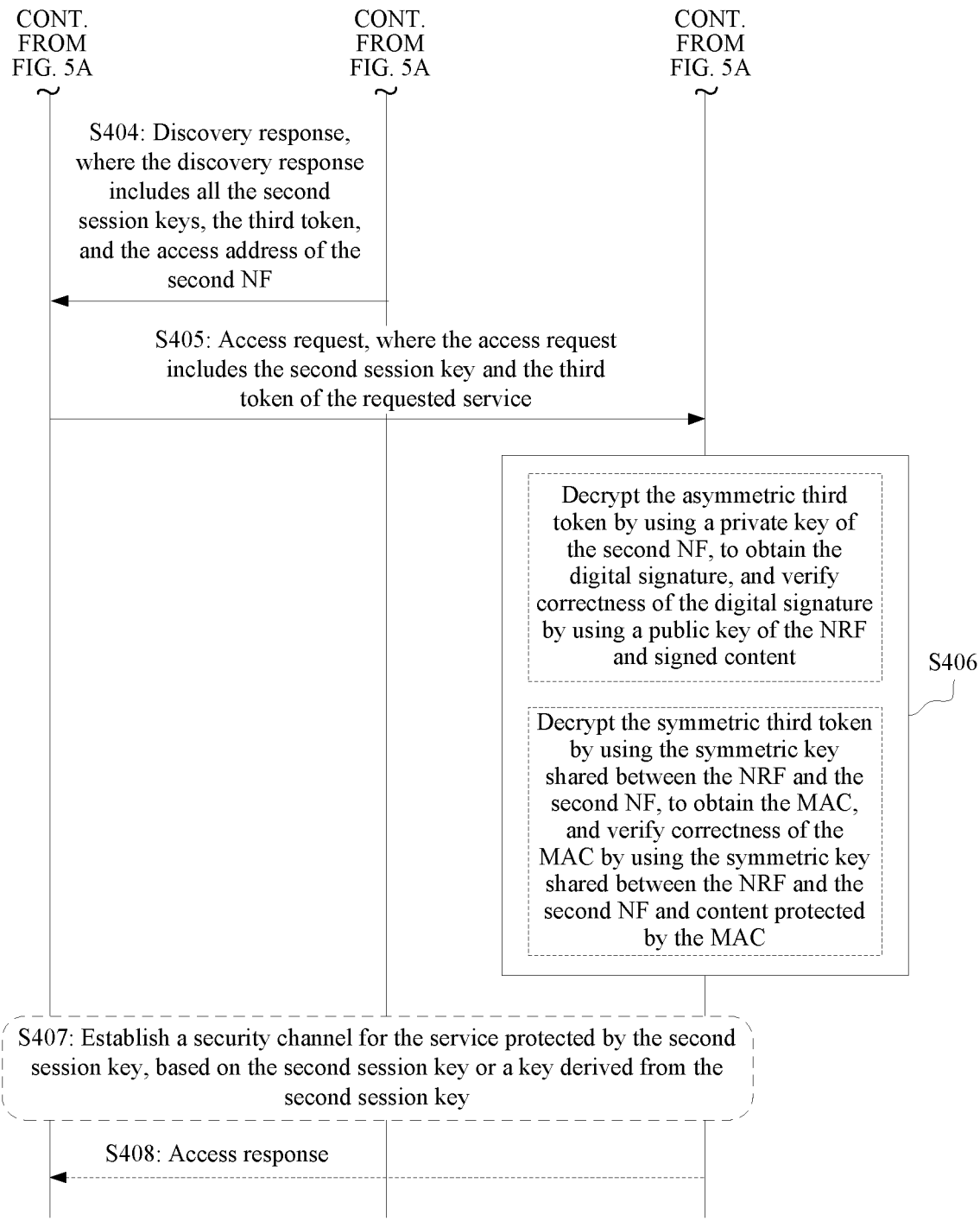

FIG. 5A and FIG. 5B are implementation flowcharts of a discovery method based on a service-based architecture according to Embodiment 3 of this application. In FIG. 5A and FIG. 5B, steps S401 and S402 are the same as steps S301 and S302 in Embodiment 2, and an implementation process of determining an ID_NF2 and generating a second K_session in S403 is also the same as that of determining the ID_NF2 and generating the second K_session in Embodiment 2. Therefore, details are not described herein again. Only different parts are described in the following.

S403: The NRF generates a third token based on generated second K_sessions.

In this embodiment of this application, the third token may be a symmetric third token, or may be an asymmetric third token.

In a possible implementation, in this embodiment of this application, the NRF may encrypt a digital signature, the ID_NF1, the ID_NF2, and all the second K_sessions based on a PKNF2, to generate an asymmetric third token. The digital signature is generated by the NRF by performing a digital signature algorithm on the ID_NF1 and all the second K_sessions based on a private key of the NRF. In another possible implementation, the NRF may alternatively encrypt message authentication code, the ID_NF1, the ID_NF2, and all the second K_sessions based on a symmetric key shared between the NRF and the second NF, to generate a symmetric third token. The message authentication code is generated by the NRF by performing a message authentication code algorithm on the ID_NF1 and all the second K_sessions based on the symmetric key shared between the NRF and the second NF. A calculation parameter of the third token may also include service IDs of all services protected by all the second K_sessions.

In this embodiment of this application, for a process of generating the asymmetric third token or the symmetric third token, an implementation similar to that of generating a symmetric second token or an asymmetric second token in Embodiment 1 may be used, and a difference lies in that generation herein needs to be performed based on the second K_sessions and all the service IDs of the services protected by the second K_sessions. Other parametric values may be similar, and therefore details are not described herein again. For details, refer to descriptions in Embodiment 1.

S404: The NRF sends a discovery response to the first NF, where the discovery response includes all the second K_sessions and the third token, and further includes at least one of the ID_NF2 or the address of the NF2.

S405: The first NF receives the discovery response sent by the NRF, and sends an access request to the second NF based on the ID_NF2 included in the discovery response, where the access request includes the ID_NF2 and the third token. For example, if the service requested by the first NF is a service 1, the access request may include a second K_session1 and the third token.

S406: The second NF receives the access request sent by the first NF, and verifies correctness of the third token included in the access request.

In this embodiment of this application, an implementation process for the second NF to verify the third token is similar to that of verifying a first token in Embodiment 1, and therefore details are not described herein again.

Step S407 is the same as step S307, and details are not described herein again. Step S407 is optional.

Similarly, this embodiment of this application may also include a step of sending an access response to the first NF:

S408: The second NF sends the access response to the first NF, to notify the first NF that whether the first NF successfully accesses the second NF.

Step S408 is optional.

In the discovery method based on a service-based architecture provided in Embodiment 3 of this application, the NRF generates a second K_session for each service requested by the first NF, and adds all second K_sessions to one third token. This can implement service-based security protection, and sending one token to the second NF can reduce communication complexity.

Embodiment 4

Figure 6A:
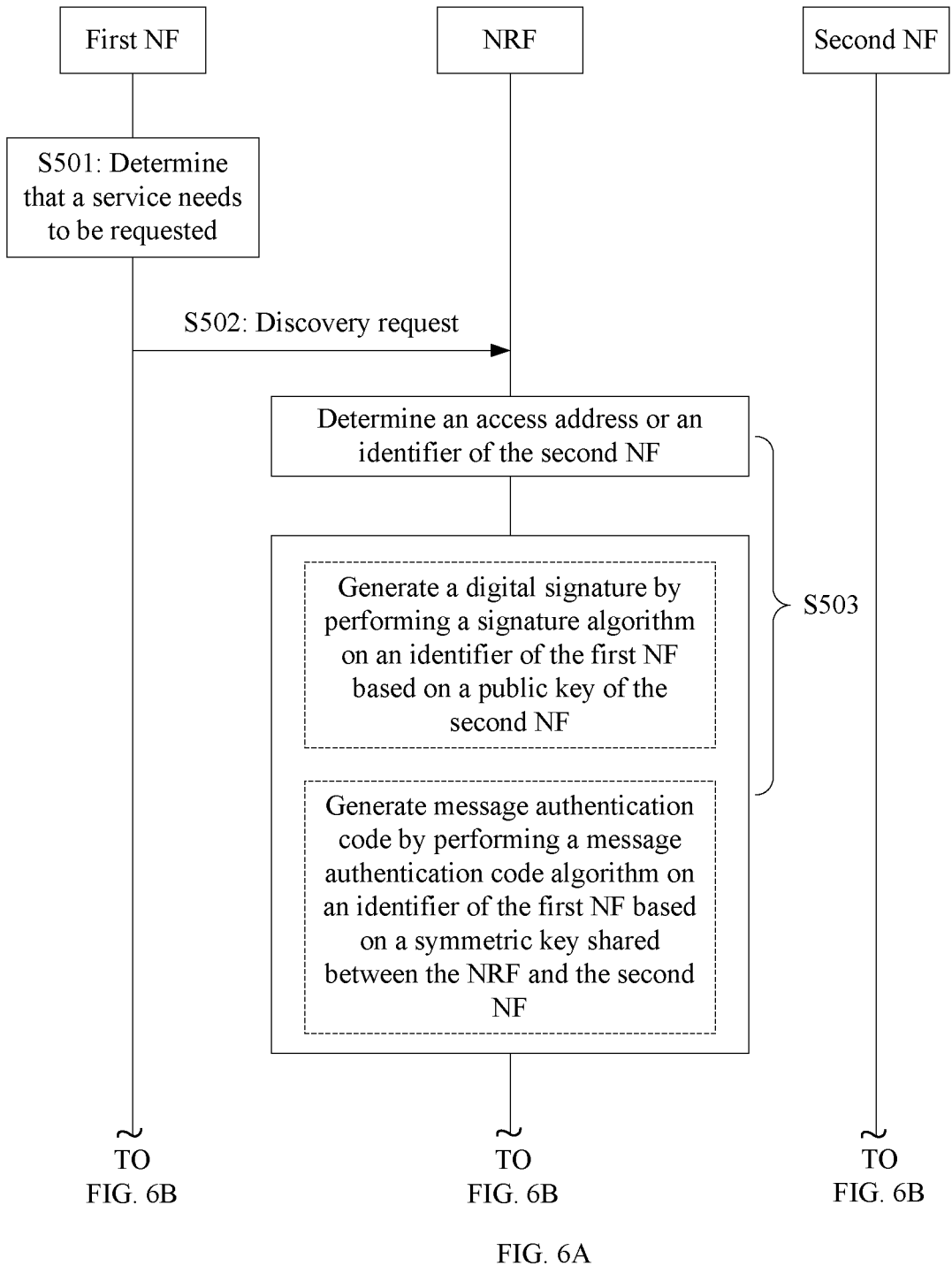
FIG. 6A and FIG. 6B are implementation flowcharts of a discovery method based on a service-based architecture according to Embodiment 4 of this application.
Figure 6B:
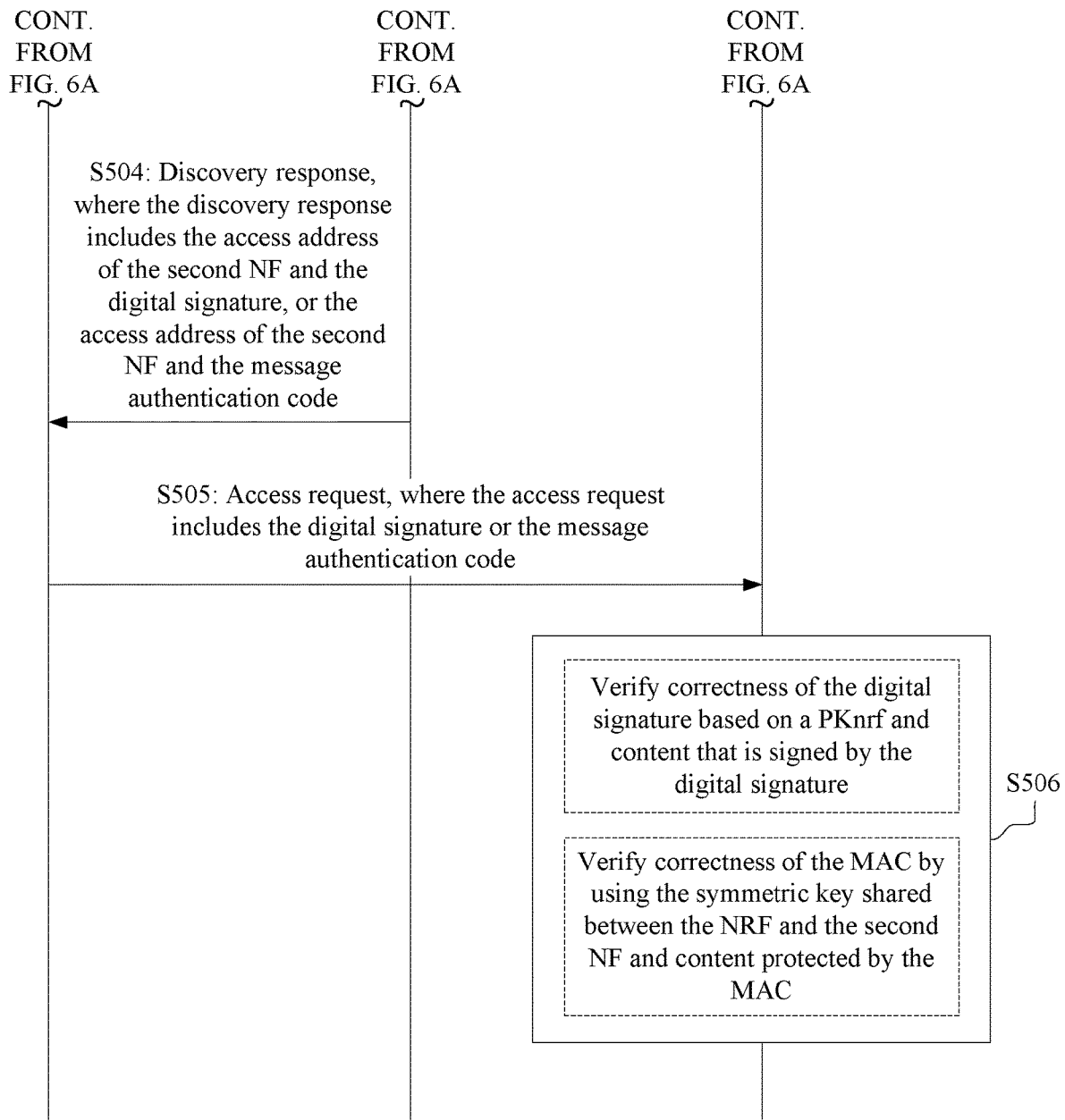

FIG. 6A and FIG. 6B show a discovery method based on a service-based architecture according to Embodiment 4 of this application. In FIG. 6A and FIG. 6B, steps S501 and S502 are the same as steps S201 and S202 in Embodiment 1. Details are not described herein again. Only different parts are described in the following.

S503: The NRF receives the discovery request sent by the first NF, and determines an ID_NF2 and a security parameter.

An implementation process for the NRF to determine the ID_NF2 is similar to that in the foregoing embodiment. Details are not described herein again.

In this embodiment of this application, the NRF does not need to generate a session key shared between the first NF and the second NF, and may separately generate a security parameter used for the second NF to perform authorization verification on the first NF.

In this embodiment of this application, the security parameter used for the second NF to perform authorization verification on the first NF may be a digital signature or MAC.

In a possible implementation, the security parameter used for the second NF to perform authorization verification on the first NF may include a digital signature, and the digital signature used for the second NF to perform authorization verification on the first NF may be generated by the NRF based on an SKnrf. To generate the digital signature based on the SKnrf by the NRF, a PKNF2, a PKnrf, and the SKnrf need to be pre-saved on the NRF. The PKNF2 may be initially preset on the NRF, or may be sent by the second NF to the NRF during interaction between the second NF and the NRF. The second NF also needs to pre-save the PKnrf. The PKnrf may be initially preset on the second NF, or may be sent by the NRF to the NRF during interaction between the second NF and the NRF.

For example, in this embodiment of this application, the NRF may perform a digital signature algorithm on the ID_NF1 based on the SKnrf. Further, in addition to performing of a digital signature algorithm on the ID_NF1, the NRF may further perform a digital signature algorithm on one or more of an ID_NRF, a PLMN ID of the first NF, a PLMN ID of the second NF, or the service identifier of the service requested by the first NF. The NRF may further perform a signature algorithm on at least one of a signature validity period (time), a signature nonce (nonce_sign), a counter, or a sequence number.

In another possible implementation, the security parameter used for the second NF to perform authorization verification on the first NF may include MAC, and the MAC used for the second NF to perform authorization verification on the first NF may be generated by the NRF based on a symmetric key shared between the NRF and the second NF. When the NRF generates the MAC based on the symmetric key shared between the NRF and the second NF, the NRF and the second NF need to pre-save the shared symmetric key.

For example, the MAC used for the second NF to perform authorization verification on the first NF may be generated by the NRF by performing a message authentication code algorithm on the ID_NF1 based on the symmetric key shared between the NRF and the second NF.

Further, the MAC may also be generated by the NRF by performing, based on the symmetric key shared between the NRF and the second NF, a message authentication code algorithm on one or more of an ID_NRF, a PLMN ID of the first NF, a PLMN ID of the second NF, or the service identifier of the service requested by the first NF, in addition to the foregoing parametric value. The NRF may further perform a message authentication code algorithm on at least one of a MAC validity period (time), a MAC nonce (nonce_mac), a counter, or a sequence number.

It can be understood that the signature validity period and the MAC validity period may include a starting time and an ending time, or a starting time and a valid time, or an ending time. The signature nonce and the MAC nonce may be randomly selected by the NRF.

S504: The NRF sends a discovery response to the first NF, where the discovery response includes the digital signature or the MAC, and further includes at least one of the ID_NF2 or the address of the NF2.

S505: The first NF receives the discovery response sent by the NRF, and sends an access request to the second NF based on the ID_NF2, where the access request includes the ID_NF1 and the digital signature, or the ID_NF1 and the MAC.

The access request may further include another parametric value. For example, when the access request includes the ID_NF1 and the digital signature, the access request may further include at least one of the signature validity period, the signature nonce, the counter, or the sequence number on which a digital signature algorithm is performed. Alternatively, when the access request includes the ID_NF1 and the MAC, the access request may further include at least one of the MAC validity period, the MAC nonce, the counter, or the sequence number on which a message authentication code algorithm is performed.

S506: The second NF receives the access request sent by the first NF, and verifies correctness of the digital signature or the MAC included in the access request.

For example, if the security parameter includes the digital signature, the second NF may verify the correctness of the digital signature based on the PKnrf and content that is signed by the digital signature, and the content signed by the digital signature includes the ID_NF1. If verifying that the digital signature is correct, the second NF determines that the access request sent by the first NF is authorized by the NRF, and the first NF is permitted to access the second NF. If verifying that the digital signature is incorrect, the second NF determines that the access request sent by the first NF is not authorized by the NRF, and the first NF is not permitted to access the second NF.

If the security parameter includes the MAC, the second NF may verify the correctness of the MAC using the symmetric key shared between the NRF and the second NF and content protected by the MAC. The content protected by the MAC includes the ID_NF1. If verifying that the MAC is correct, the second NF determines that the access request sent by the first NF is authorized by the NRF, and the first NF is permitted to access the second NF. If verifying that the MAC is incorrect, the second NF determines that the access request sent by the first NF is not authorized by the NRF, and the first NF is not permitted to access the second NF.

In a possible example, in this embodiment of this application, the NRF may generate a digital signature or MAC based on each service requested by the first NF, to implement authorization verification at a service level.

Similarly, this embodiment of this application may also include a step of sending an access response to the first NF.

In the discovery method based on a service-based architecture provided in Embodiment 4 of this application, the NRF generates the digital signature or the MAC, and when the NRF and the second NF do not exchange the security parameter, the second NF can perform authorization verification on the first NF. This lessens a quantity of times of communication between the NF and the NRF in a discovery process to some extent, and further can reduce communication complexity to some extent.

Embodiment 5

In this embodiment of this application, if an NRF that controls and manages a first NF belongs to a first PLMN, an NRF that controls and manages a second NF belongs to a second PLMN, and the first PLMN is different from the second PLMN, a security parameter used for performing authorization verification on the first NF may be generated by the NRF that belongs to the second PLMN and sent to the NRF that belongs to the first PLMN. The NRF that belongs to the first PLMN receives the security parameter sent by the NRF that belongs to the second PLMN, and sends a discovery response to the first NF, where the discovery response includes the security parameter obtained from the NRF that belongs to the second PLMN. For an implementation process, refer to FIG. 7.

Figure 7:
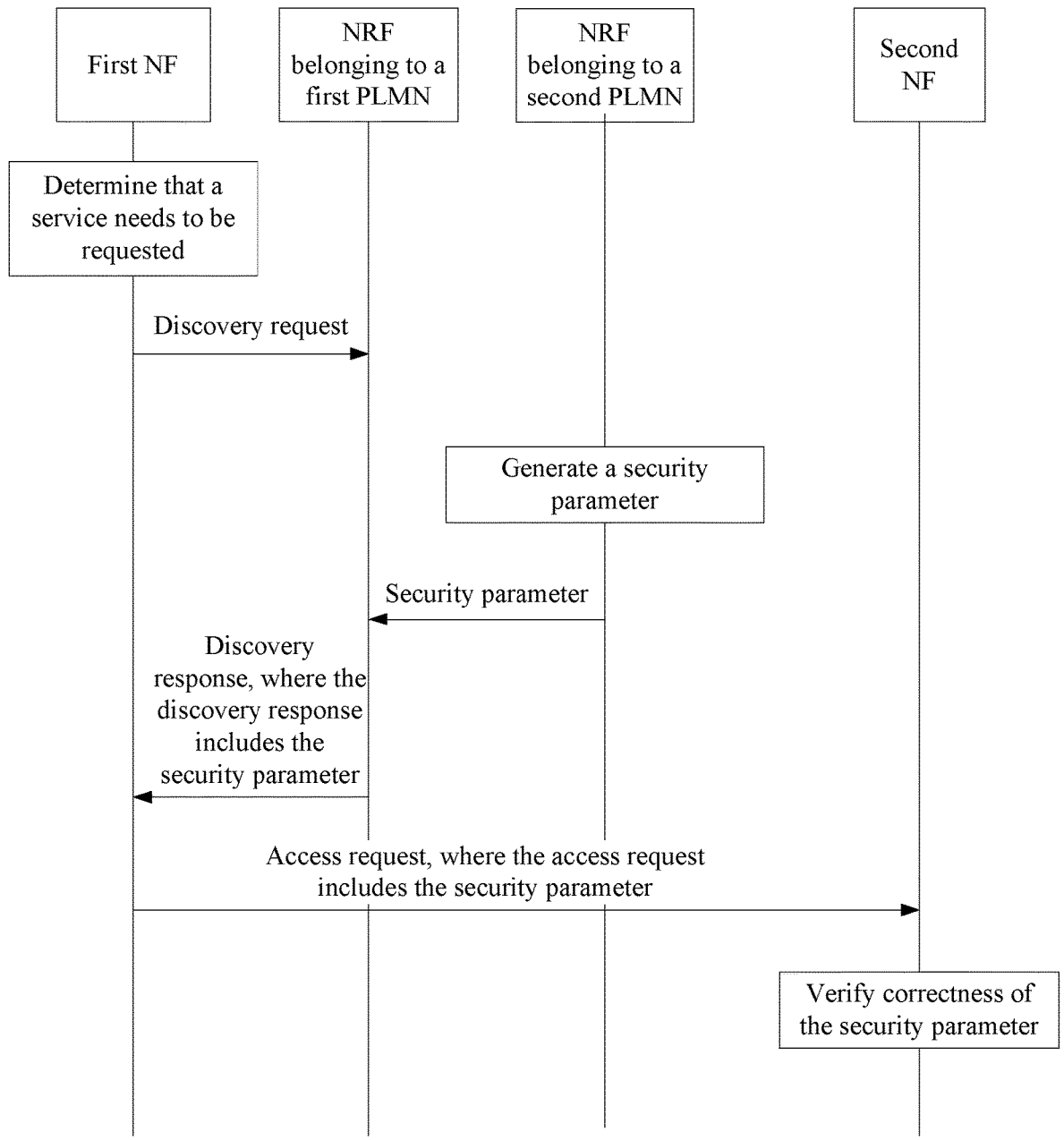
FIG. 7 is an implementation flowchart of a discovery method based on a service-based architecture according to Embodiment 5 of this application.

FIG. 7 is a flowchart of a discovery method based on a service-based architecture, and is applicable to a scenario in which the first NF and/or the second NF roam/roams, namely, a scenario in which the first PLMA to which the NRF that controls and manages the first NF belongs and the second PLMA to which the NRF that controls and manages the first NF belongs are different. An implementation process for the NRF that belongs to the second PLMN to generate the security parameter in this scenario is similar to implementation processes of generating the security parameter in Embodiment 1 to Embodiment 4. A difference lies in that a parametric value used by the NRF to generate the security parameter further includes a PLMN ID in addition to the parametric values in the foregoing embodiments.

Embodiment 6

In this embodiment of this application, during implementation of the foregoing embodiments, if a service needs to be changed, for example, in a scenario in which the requested service is to be canceled, or the requested service is to be modified, the following implementations may be used.

Figure 8:
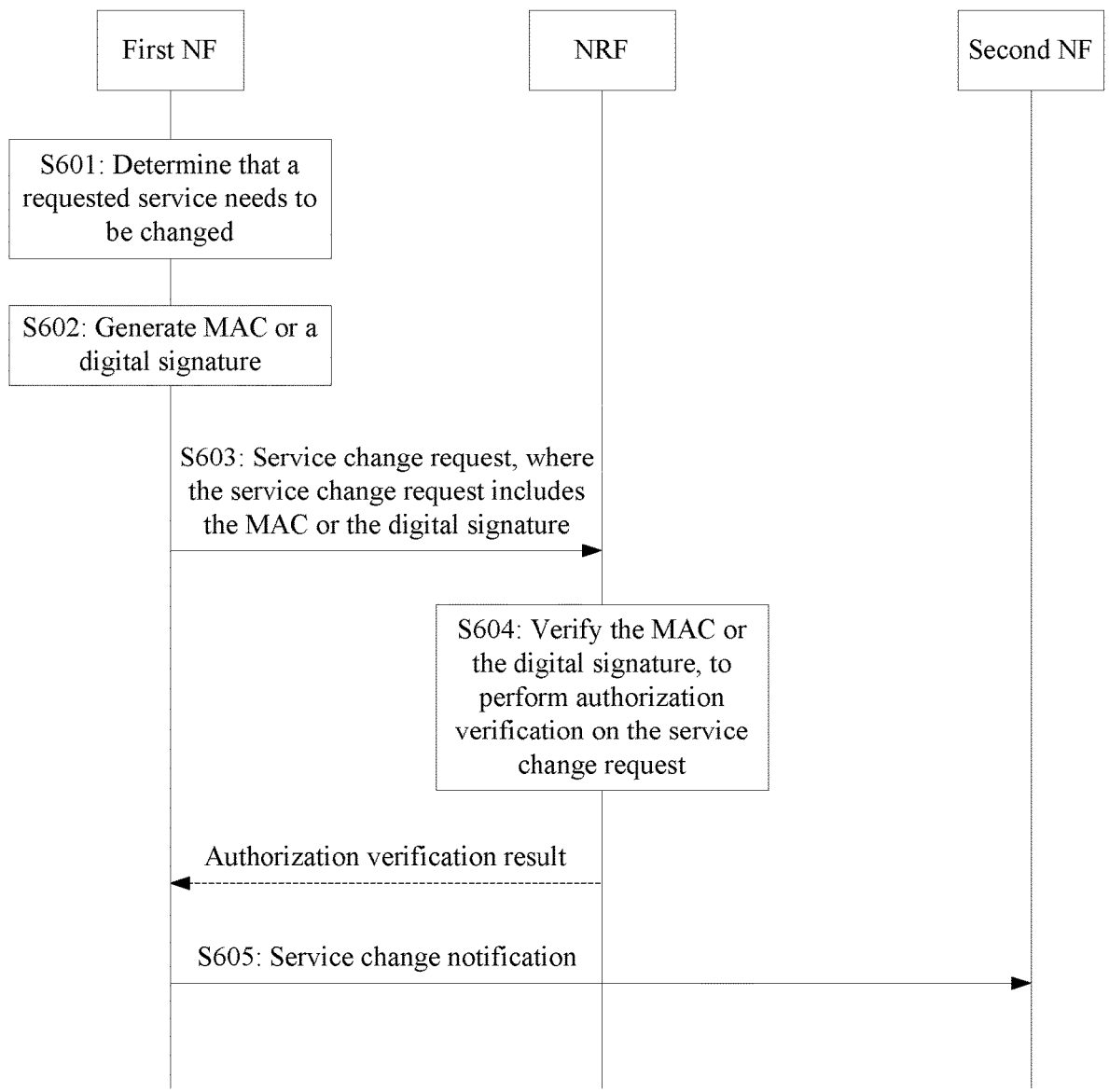
FIG. 8 is an implementation flowchart of a discovery method based on a service-based architecture according to Embodiment 6 of this application.

In a first implementation, the first NF initiates a service change request, and an implementation procedure is shown in FIG. 8.

S601: The first NF determines that the requested service needs to be changed, for example, a service of a service ID1 needs to be canceled or modified.

In this embodiment of this application, the first NF may change one or more services.

S602: The first NF generates MAC or a digital signature, where the MAC or the digital signature may perform security protection on the service change request sent by the first NF to the NRF.

For example, the MAC that performs security protection on the service change request may be generated by the first NF by performing a message authentication code algorithm on a service ID of the service requested to change by the service change request, a symmetric key validity period, and an ID_NF1 based on a symmetric key shared between the first NF and the NRF. The digital signature that performs security protection on the service change request may be generated by the first NF by performing a digital signature algorithm on the service ID of the service requested to change by the service change request, a digital signature validity period, and the ID_NF1 based on a private key of the first NF.

In this embodiment of this application, if the first NF changes a plurality of services, the first NF may generate a digital signature or MAC for each to-be-changed service, and certainly, may alternatively generate one digital signature or one MAC for the plurality of services.

S603: The first NF sends the service change request to the NRF, where the service change request includes the MAC or the digital signature that performs security protection on the service change request.

S604: The NRF receives the service change request sent by the first NF, and performs authorization verification on the service change request sent by the first NF.

In this embodiment of this application, the NRF may implement authorization verification on the service change request sent by the first NF, based on verification on the MAC or the digital signature.

For example, if a parameter that performs security protection on the service change request is the MAC, the NRF may verify the received MAC based on the pre-saved symmetric key shared by the NRF and the first NF and received content protected by the MAC. If verifying that the MAC is correct, the NRF determines that the received service change request is authorized by the first NF, and may change the service that is requested to change by the service change request. If verifying that the MAC is incorrect, the NRF determines that the received service change request is not authorized by the first NF, and may refuse to change the service that is requested to change by the service change request.

If a parameter that performs security protection on the service change request is the digital signature, the NRF may verify the received digital signature based on a PKNF1 and content that is protected by the digital signature. The PKNF1 may be pre-saved by the NRF, or may be obtained during interaction between the NRF and the first NF. If verifying that the digital signature is correct, the NRF determines that the received service change request is authorized by the first NF, and may change the service that is requested to change by the service change request. If verifying that the digital signature is incorrect, the NRF determines that the received service change request is not authorized by the first NF, and may refuse to change the service that is requested to change by the service change request.

In this embodiment of this application, an implementation process for the NRF to change the service that is requested to change by the service change request is not limited. For example, the first NF may send a change policy to the NRF, and the change policy may be protected by the digital signature or the MAC.

In a possible example, after performing authorization verification on the service change request sent by the first NF, the NRF may send an authorization verification result to the first NF. Certainly, this execution process is optional.

S605: If the first NF has accessed the second NF, the first NF may send a service change notification to the second NF, to instruct the second NF to change the service.

Step S605 is optional.

Figure 9:
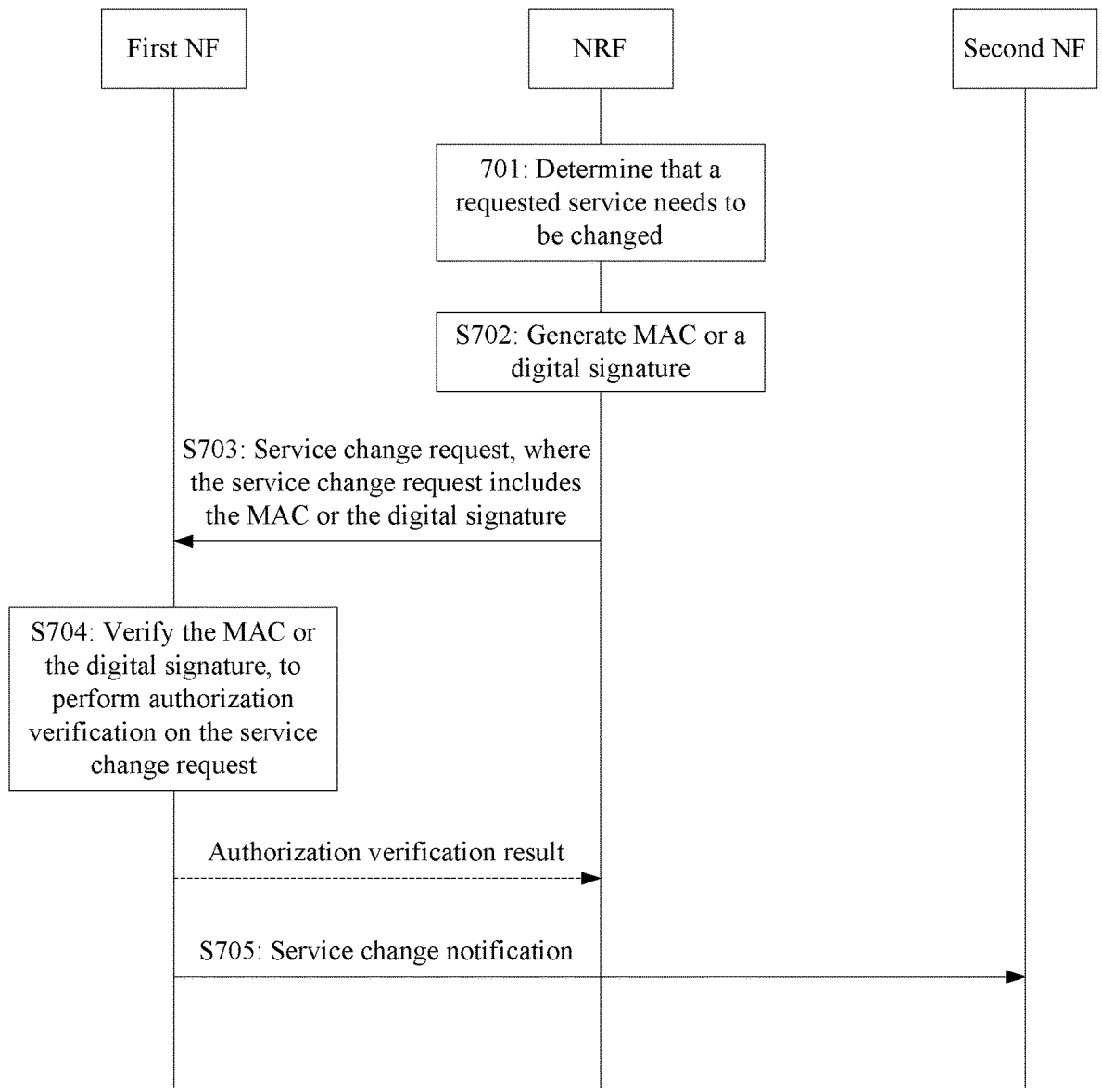
FIG. 9 is an implementation flowchart of another discovery method based on a service-based architecture according to Embodiment 6 of this application.

In a second implementation, the NRF initiates a service change request, and an implementation procedure is shown in FIG. 9.

S701: The NRF determines that the requested service needs to be changed, for example, a service of a service ID1 needs to be canceled or modified.

In this embodiment of this application, the NRF may change one or more services.

S702: The NRF generates MAC or a digital signature, where the MAC or the digital signature may perform security protection on the service change request sent by the NRF to the first NF.

For example, a generation process of the MAC or the digital signature that performs security protection on the service change request is similar to a process of generating, by the first NF, the MAC or the digital signature that performs security protection on the service change request in the foregoing embodiment. Therefore, details are not described herein again.

In this embodiment of this application, if the NRF changes a plurality of services, the NRF may generate a digital signature or MAC for each to-be-changed service, and certainly, may alternatively generate one digital signature or one MAC for the plurality of services.

S703: The NRF sends the service change request to the first NF, where the service change request includes the MAC or the digital signature that performs security protection on the service change request.

S704: The first NF receives the service change request sent by the NRF, and performs authorization verification on the service change request sent by the NRF.

An implementation process for the first NF to perform authorization verification on the service change request sent by the NRF is similar to an implementation process for the NRF to perform authorization verification on the service change request sent by the first NF. Therefore, details are not described herein again.

In a possible example, after performing authorization verification on the service change request sent by the NRF, the first NF may send an authorization verification result to the NRF.

S705: If the first NF has accessed the second NF, the first NF may send a service change notification to the second NF, to instruct the second NF to change the service.

Step S705 is optional.

Figure 10:
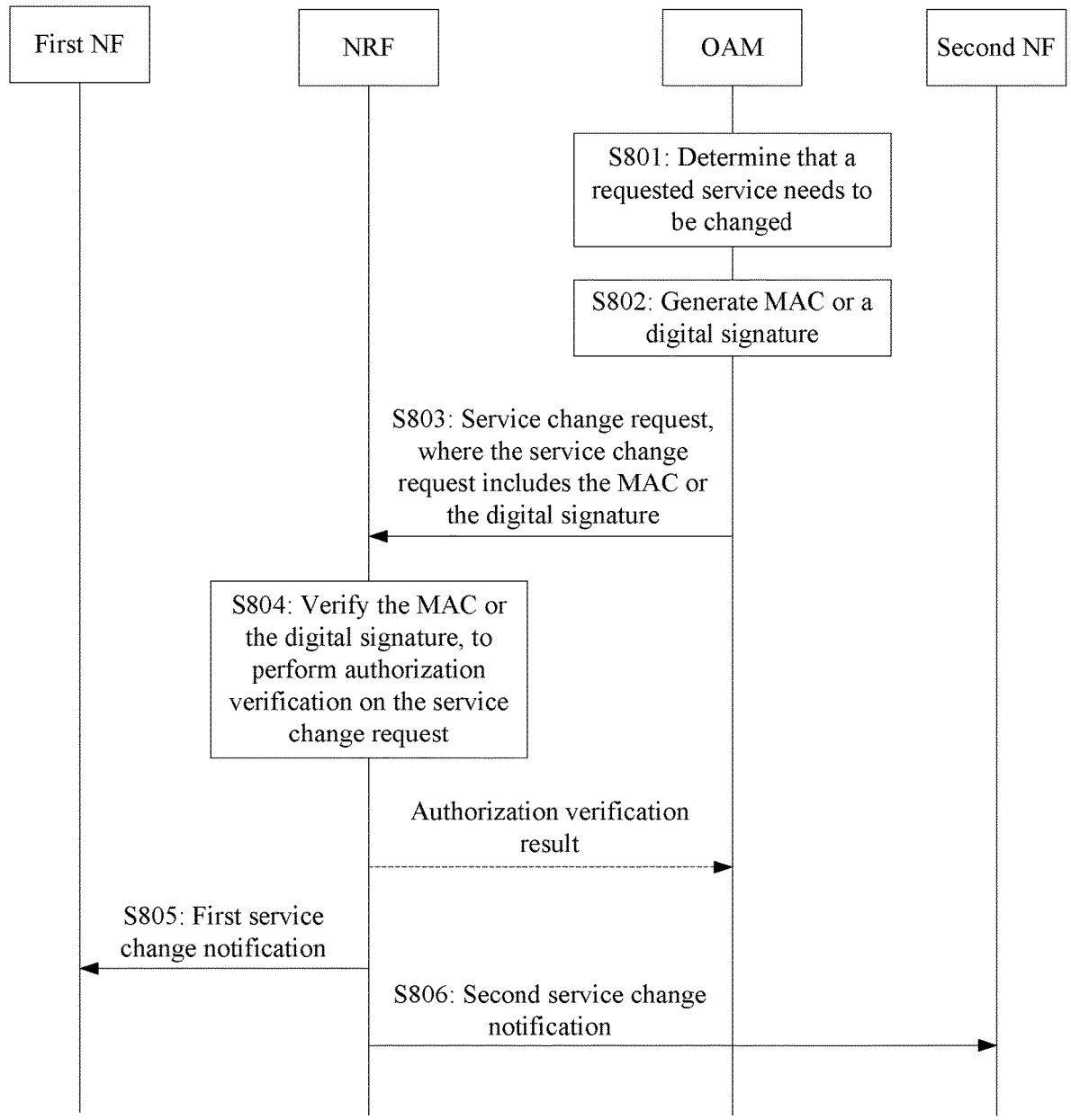
FIG. 10 is an implementation flowchart of still another discovery method based on a service-based architecture according to Embodiment 6 of this application.

In a third implementation, an OAM initiates a service change request, and an implementation procedure is shown in FIG. 10.

S801: The OAM determines that a service requested by the first NF needs to be changed, for example, a service of a service ID1 needs to be canceled or modified.

In this embodiment of this application, the OAM may change one or more services requested by the first NF.

S802: The OAM generates MAC or a digital signature, where the MAC or the digital signature may perform security protection on the service change request sent by the OAM to the NRF.

For example, a generation process of the MAC or the digital signature that performs security protection on the service change request is similar to a process of generating, by the NRF, the MAC or the digital signature that performs security protection on the service change request in the foregoing embodiment. A difference lies in that the OAM determines the MAC based on a symmetric key shared between the OAM and the NRF, or that the OAM determines the digital signature based on a PKnrf. When the OAM determines the MAC, the symmetric key needs to be shared between the OAM and the NRF in advance. When determining the digital signature, the OAM needs to pre-save a public key of the OAM, a private key of the OAM, and the PKnrf, and the NRF needs to pre-save the public key of the OAM. For same parts, details are not described herein again.

In this embodiment of this application, if the OAM changes a plurality of services, the OAM may generate a digital signature or MAC for each to-be-changed service, and certainly, may alternatively generate one digital signature or one MAC for the plurality of services.

S803: The OAM sends the service change request to the NRF, where the service change request includes the MAC or the digital signature that performs security protection on the service change request.

S804: The NRF receives the service change request sent by the OAM, and performs authorization verification on the service change request sent by the OAM.

In this embodiment of this application, in an implementation process for the NRF to perform authorization verification on the service change request sent by the OAM, the NRF may verify the MAC based on the symmetric key shared between the NRF and the OAM, or may verify correctness of the digital signature based on the public key of the OAM. Another process is similar to an implementation process for the NRF to perform authorization verification on a service change request sent by the first NF. Therefore, details are not described herein again.

In a possible example, after performing authorization verification on the service change request sent by the OAM, the NRF may send an authorization verification result to the OAM.

S805: If determining that the OAM authorizes the sent service change request, the NRF sends a service change notification to the first NF.

In this embodiment of this application, for ease of description, the service change notification sent by the NRF to the first NF is referred to as a first service change notification. The first service change notification is sent by the NRF when determining that the service change request sent by the OAM is authorized.

S806: The first NF receives the first service change notification sent by the NRF, and when determining that the first NF has accessed the second NF, sends a service change notification to the second NF, to instruct the second NF to change the service.

In this embodiment of this application, for ease of description, the service change notification sent by the first NF to the second NF may be referred to as a second service change notification. The second service change notification is sent by the first NF to the second NF, and is used to instruct the second NF to change the service.

The method provided in Embodiment 6 of this application is applicable to a scenario in which a service needs to be changed.

In the embodiments of this application, for the foregoing embodiments, if the first NF knows the identifier of the second NF, but does not know the address of the second NF, the first NF sends a discovery request to the NRF, where the discovery request includes the identifier of the second NF. The NRF verifies the identifier of the second NF, and if verification succeeds, sends the address of the second NF to the first NF. Other parameters are the same as those in the foregoing embodiments.

In the embodiments of this application, for the foregoing embodiments, the identifier of the NF1 in the discovery request sent by the NF1 to the NRF is optional.

In the embodiments of this application, all the foregoing asymmetric technology-based embodiments can still be implemented based on an identity technology. Different from that in a certificate-based asymmetric security technology, a public key PK may be an ID, namely, a user identity in the identity-based technology.

In the embodiments of this application, the foregoing embodiments in which the MAC and a signature are used for authentication further include a possibility that a K_session is generated based on DH (Diffie-Hellman) key negotiation, to be more specific, the NRF generates a public key PK_DH_NRF and an SK_DH_NRF that are obtained through DH key negotiation, and uses the MAC or the signature to protect the PK_DH_NRF. In addition, the NRF sends the PK_DH_NRF and the SK_DH_NRF to the first NF. The first NF further sends the PK_DH_NRF to the second NF in addition to sending of an access request as described in the foregoing embodiments. After successfully verifying the MAC or the signature, the second NF generates a PK_DH_NF2 and an SK_DH_NF2. The second NF generates a K_session based on the PK_DH_NRF and the SK_DH_NF2. The second NF sends the PK_DH_NF2 to the first NF. In this case, the first NF may generate a K_session based on the PK_DH_NF2 and the SK_DH_NRF. Formats of the parameters and a manner of calculating the K_session are similar to those in a classic DH key negotiation procedure. A DH key protocol is not limited, and includes but not limited to a discrete logarithm and the like.

The foregoing mainly describes, in terms of interaction between a management network element, a functional network element, and a control network element, the solutions provided in the embodiments of this application. It can be understood that, to implement the foregoing functions, the management network element, the functional network element, and the control network element include corresponding hardware structures and/or software modules for performing the functions. Units and algorithm steps in examples described with reference to the embodiments disclosed in this application can be implemented in a form of hardware or hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, a first functional network element, a second functional network element, and a control network element may be divided into functional units according to the foregoing method examples. For example, various functional units may be obtained through division in correspondence to various functions, or two or more functions may be integrated into one processing unit. The integrated unit may be implemented in a form of hardware, or may be implemented in a form of a software functional unit. It should be noted that, in the embodiments of this application, unit division is an example, and is merely a logical function division. In actual implementation, another division manner may be used.

Figure 11:
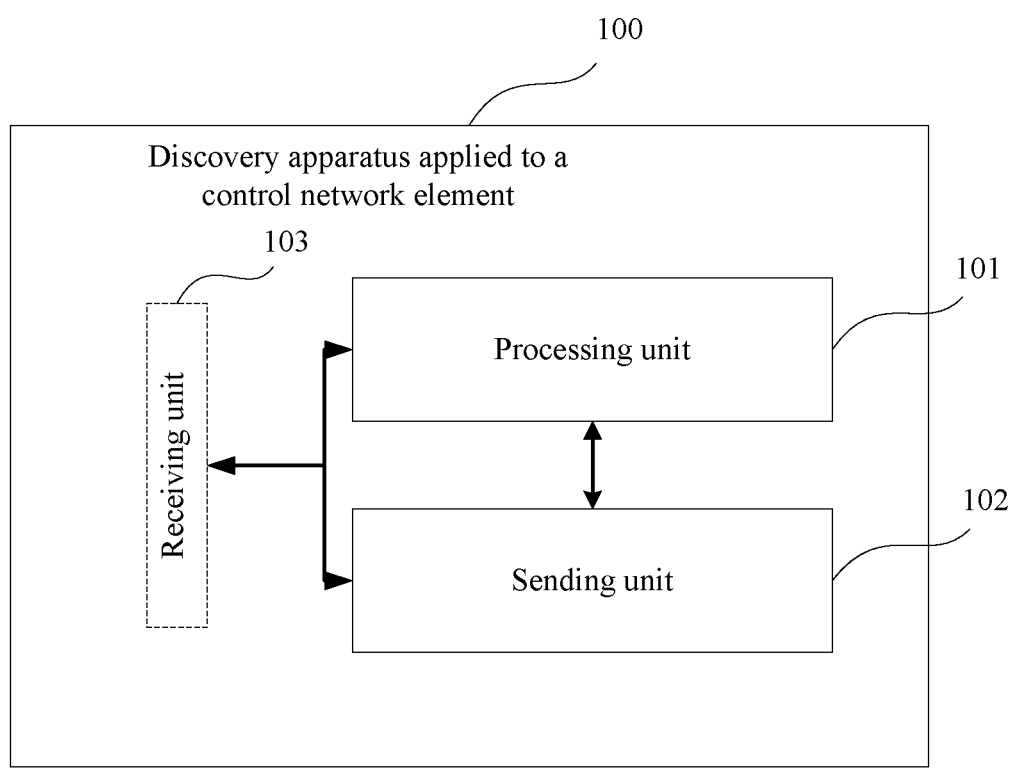
FIG. 11 is a schematic structural diagram of a discovery apparatus applied to a control network element according to an embodiment of this application.

When a form of a software functional unit is used for implementation, FIG. 11 is a schematic structural diagram of a discovery apparatus 100 based on a service-based architecture according to an embodiment of this application. The discovery apparatus 100 based on a service-based architecture may be applied to the control network element. Referring to FIG. 11, the discovery apparatus 100 applied to a control network element may include a processing unit 101 and a sending unit 102. The processing unit 101 is configured to determine a security parameter. The sending unit 102 is configured to send a discovery response to a first functional network element, where the discovery response includes the security parameter generated by the processing unit 101.

In a possible example, the security parameter includes an asymmetric first token and a first session key that is shared between the first functional network element and a second functional network element.

The processing unit 101 is configured to: generate the first session key; perform a digital signature algorithm on an identifier of the first functional network element and the first session key based on a private key of the control network element, to generate a digital signature; and encrypt the digital signature, the identifier of the first functional network element, an identifier of the second functional network element, and the first session key based on a public key of the second functional network element, to generate an asymmetric first token. The sending unit 102 is configured to send, to the first functional network element, the asymmetric first token generated by the processing unit 101 as the security parameter.

In another possible example, the security parameter includes a symmetric first token and a first session key that is shared between the first functional network element and a second functional network element.

The processing unit 101 is configured to: generate the first session key; perform a message authentication code algorithm on an identifier of the first functional network element and the first session key based on a symmetric key shared between the control network element and the second functional network element, to generate message authentication code; and encrypt the message authentication code, the identifier of the first functional network element, an identifier of the second functional network element, and the first session key based on the symmetric key shared between the control network element and the second functional network element, to generate the symmetric first token. The sending unit 102 is configured to send, to the first functional network element, the symmetric first token generated by the processing unit 101 as the security parameter.

In a possible implementation, the processing unit 101 randomly selects the first session key. In another possible implementation, the processing unit 101 performs derivation on the identifier of the first functional network element and the identifier of the second functional network element based on a derivation key, to generate the first session key. The derivation key is obtained by the control network element by performing key derivation on a preset root key, or the derivation key is a key saved by the control network element.

In this embodiment of this application, the discovery apparatus 100 applied to the control network element generates the symmetric first token or the asymmetric first token, and the first session key used to protect all data used for communication between the first functional network element and the second functional network element. This can implement connection-based security protection, and implement security authentication on the security parameter between the first functional network element and the second functional network element when the control network element and the second functional network element do not exchange the security parameter. This lessens a quantity of times of communication between the functional network element and the control network element in a discovery process to some extent, and further can reduce communication complexity to some extent.

In still another possible example, the security parameter includes a second session key shared between the first functional network element and a second functional network element, and an asymmetric second token generated based on each second session key.

The processing unit 101 is configured to: generate the second session key for each service requested by the first functional network element; perform a digital signature algorithm on an identifier of the first functional network element and the second session key based on a private key of the control network element for each service requested by the first functional network element, to generate a digital signature; and encrypt the digital signature, the identifier of the first functional network element, an identifier of the second functional network element, a service identifier of a service protected by the second session key, and the second session key based on a public key of the second functional network element for each service requested by the first functional network element, to generate an asymmetric second token of each service. The sending unit 102 is configured to send, to the first functional network element, the asymmetric second token corresponding to each service generated by the processing unit 101 as the security parameter.

In still another possible example, the security parameter includes a second session key shared between the first functional network element and a second functional network element, and a symmetric second token generated based on each second session key.

The control network element 101 generates the second session key that protects each service requested by the first functional network element. The control network element performs, for each service requested by the first functional network element, a message authentication code algorithm on an identifier of the first functional network element and the second session key based on a symmetric key shared between the control network element and the second functional network element, to generate message authentication code. The control network element encrypts the message authentication code, the identifier of the first functional network element, an identifier of the second functional network element, a service identifier of a service protected by the second session key, and the second session key based on the symmetric key shared between the control network element and the second functional network element, to generate a symmetric second token for each service requested by the first functional network element. The sending unit 102 is configured to send, to the first functional network element, the symmetric second token generated by the processing unit 101 as the security parameter.

In this embodiment of this application, the discovery apparatus 100 applied to the control network element generates the second session key and the second token for each service requested by the first functional network element. This can implement service-based security protection, and implement security authentication on the security parameter between the first functional network element and the second functional network element when the control network element and the second functional network element do not exchange the security parameter. This lessens a quantity of times of communication between the functional network element and the control network element in a discovery process to some extent, and further can reduce communication complexity to some extent.

In still another possible example, the security parameter includes a second session key shared between the first functional network element and a second functional network element, and an asymmetric third token generated based on all second session keys.

The processing unit 101 is configured to: generate the second session key that protects each service requested by the first functional network element; perform a digital signature algorithm on an identifier of the first functional network element and all the second session keys based on a private key of the control network element, to generate a digital signature; and encrypt the digital signature, the identifier of the first functional network element, an identifier of the second functional network element, service identifiers of services protected by all the second session keys, and all the second session keys based on a public key of the second functional network element, to generate an asymmetric third token of the services. The sending unit 102 is configured to send, to the first functional network element, the asymmetric third token generated by the processing unit 101 as the security parameter.

In still another possible example, the security parameter includes a second session key shared between the first functional network element and a second functional network element, and a symmetric third token generated based on all second session keys.

The processing unit 101 is configured to: generate the second session key that protects each service requested by the first functional network element; perform a message authentication code algorithm on an identifier of the first functional network element and all the second session keys based on a symmetric key shared between the control network element and the second functional network element, to generate message authentication code; and encrypt the message authentication code, the identifier of the first functional network element, an identifier of the second functional network element, service identifiers of services protected by all the second session keys, and all the second session keys based on the symmetric key shared between the control network element and the second functional network element, to generate the symmetric third token. The sending unit 102 is configured to send, to the first functional network element, the symmetric third token generated by the processing unit 101 as the security parameter.

In this embodiment of this application, the discovery apparatus 100 applied to the control network element generates the second session key for each service requested by the first functional network element, and adds all the second session keys to one third token. This can implement service-based security protection, and sending one token to the second functional network element can reduce communication complexity.

In a possible implementation, when the processing unit 101 generates the second session key for each service requested by the first functional network element, the second session key is randomly selected by the processing unit 101. In another possible implementation, the second session key is generated by the processing unit 101 by performing derivation on the identifier of the first functional network element and the identifier of the second functional network element based on a derivation key. The derivation key is obtained by the control network element by performing key derivation on a preset root key, or the derivation key is a key saved by the control network element.

In still another possible example, the security parameter includes a digital signature.

The processing unit 101 is configured to perform a digital signature algorithm on an identifier of the first functional network element based on a private key of the control network element, to generate the digital signature. The sending unit 102 is configured to send, to the first functional network element, the digital signature generated by the processing unit 101 as the security parameter.

The processing unit 101 may generate a digital signature based on each service requested by the first functional network element, to implement authorization verification at a service level.

In still another possible example, the security parameter includes a message authentication code.

The processing unit 101 is configured to perform a message authentication code algorithm on an identifier of the first functional network element based on a symmetric key shared between the control network element and a second functional network element, to generate the message authentication code. The sending unit 102 is configured to send, to the first functional network element, the message authentication code generated by the processing unit 101 as the security parameter.

The processing unit 101 may generate the message authentication code based on each service requested by the first functional network element, to implement authorization verification at a service level.

In still another possible example, the processing unit 101 is configured to generate a MAC or a digital signature when determining that the sending unit needs to change a requested service. The sending unit 102 is configured to send a service change request to the first functional network element, where the service change request includes the MAC or the digital signature that performs security protection on the service change request and that is generated by the processing unit 101.

In still another possible example, the discovery apparatus 100 applied to the control network element may further include a receiving unit 103.

In a possible implementation, the receiving unit 103 is configured to receive a service change request sent by the first functional network element or a management network element. The service change request includes a message authentication code or a digital signature that performs security protection on the service change request. The processing unit 101 is configured to perform authorization verification, based on the service change request received by the receiving unit 103, on the service change request sent by the first functional network element or the management network element.

When a form of hardware is used for implementation, the processing unit 101 may be a processor, the sending unit 102 may be a transmitter, and the receiving unit 103 may be a receiver. When the processing unit 101 is a processor, the sending unit 102 is a transmitter, and the receiving unit 103 is a receiver, the discovery apparatus 100 may use a structure of a control network element shown in FIG. 12. The control network element shown in FIG. 12 may be an NRF, and the NRF may be the NRF in the foregoing method embodiments.

Figure 12:
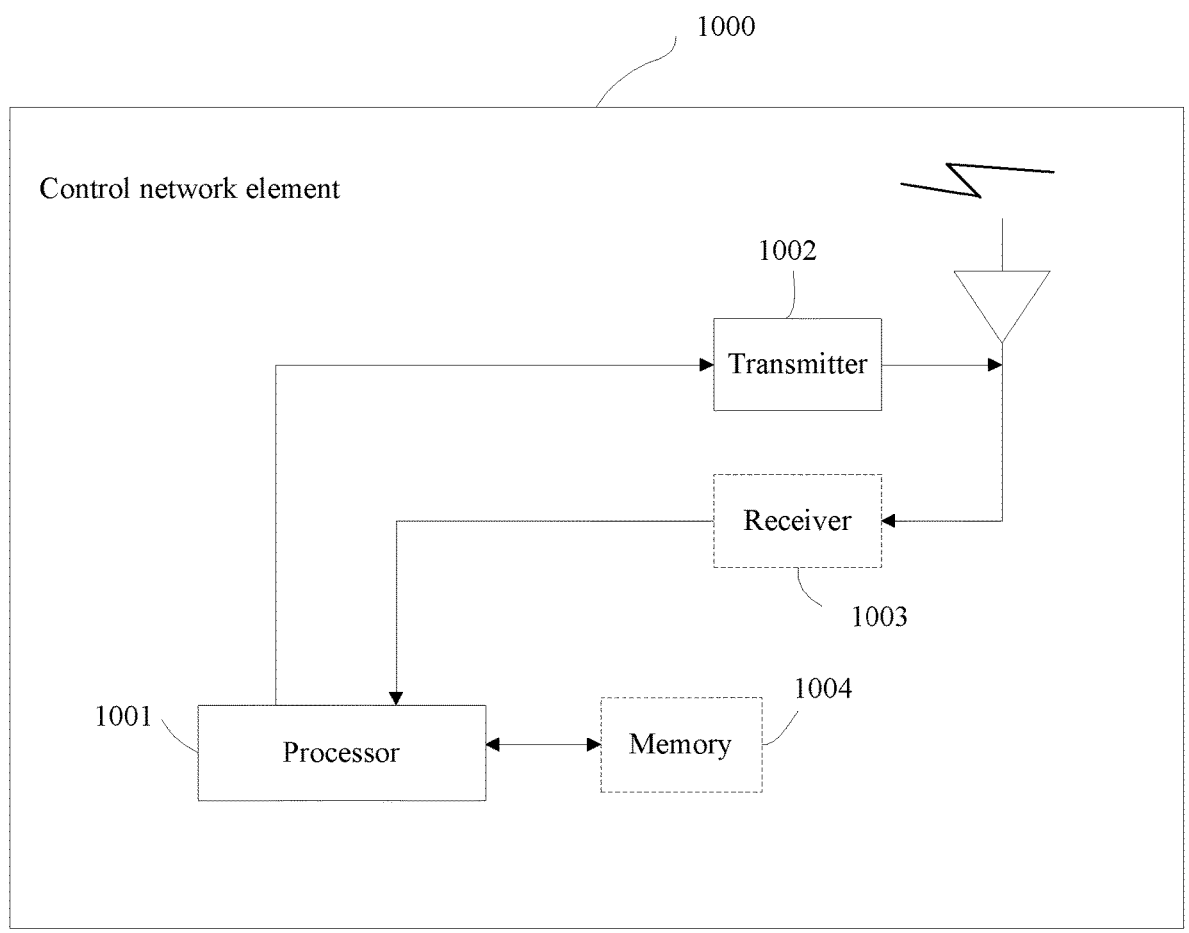
FIG. 12 is a schematic structural diagram of a control network element according to an embodiment of this application.

FIG. 12 is a schematic structural diagram of a control network element 1000 according to an embodiment of this application, that is, another schematic structural diagram of the discovery apparatus 100. Referring to FIG. 12, the control network element 1000 includes a processor 1001 and a transmitter 1002, and may further include a receiver 1003. The processor 1001 may alternatively be a controller. The processor 1001 is configured to support the control network element 1000 in implementing functions of the control network element in FIG. 2 to FIG. 10. The transmitter 1002 and the receiver 1003 are configured to support a function of sending and receiving messages between the control network element 1000 and a first functional network element. The control network element 1000 may further include a memory 1004. The memory 1004 is configured to be coupled with the processor 1001, and the memory 1004 stores a program instruction and data necessary for the control network element 1000. The processor 1001, the transmitter 1002, the receiver 1003, and the memory 1004 are connected to each other. The memory 1004 is configured to store an instruction. The processor 1001 is configured to execute the instruction stored in the memory 1004, to control the transmitter 1002 and the receiver 1003 to send and receive data, and implement steps of implementing corresponding functions by the control network element in the foregoing methods.

In this embodiment of this application, for concepts, explanations, detailed descriptions, and other steps of the discovery apparatus 100 applied to the control network element and the control network element 1000 related to the technical solutions provided in the embodiments of this application, refer to descriptions about the content in the foregoing method embodiments or other embodiments. Details are not described herein again.

Figure 13:
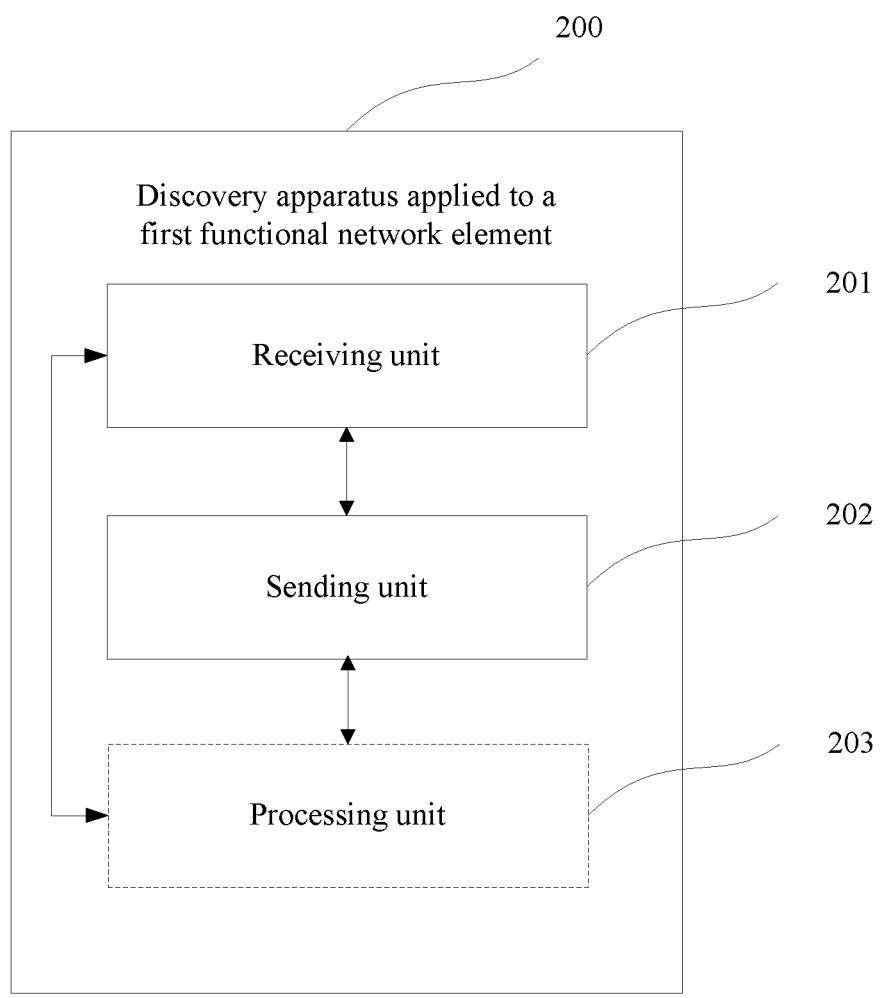
FIG. 13 is a schematic structural diagram of a discovery apparatus applied to a first functional network element according to an embodiment of this application.

When a form of a software functional unit is used for implementation, FIG. 13 is a schematic structural diagram of a discovery apparatus 200 based on a service-based architecture according to an embodiment of this application. The discovery apparatus 200 based on a service-based architecture may be applied to a first functional network element. Referring to FIG. 13, the discovery apparatus 200 applied to the first functional network element may include a receiving unit 201 and a sending unit 202. The receiving unit 201 is configured to receive a discovery response sent by a control network element, where the discovery response includes a security parameter and an access address or an identifier of a second functional network element. The sending unit 202 is configured to send an access request to the second functional network element based on the access address or the identifier received by the receiving unit, where the access request includes the security parameter received by the receiving unit 201.

In a possible example, the security parameter includes a symmetric first token or an asymmetric first token, and a first session key shared between the first functional network element and the second functional network element. The receiving unit 201 is configured to receive the symmetric first token or the asymmetric first token sent by the control network element. The sending unit 202 is configured to send, to the second functional network element, the symmetric first token or the asymmetric first token received by the receiving unit 201.

In another possible example, the security parameter includes a second session key generated based on a service identifier of each service requested by the first functional network element, and a symmetric second token or an asymmetric second token generated based on each second session key. The receiving unit 201 is configured to receive the symmetric second token or the asymmetric second token sent by the control network element. The sending unit 202 is configured to send, to the second functional network element, the symmetric second token or the asymmetric second token received by the receiving unit 201.

In still another possible example, the security parameter includes a second session key generated based on a service identifier of each service requested by the first functional network element, and a symmetric third token or an asymmetric third token generated based on all second session keys. The receiving unit 201 is configured to receive the symmetric third token or the asymmetric third token sent by the control network element. The sending unit 202 is configured to send, to the second functional network element, the symmetric third token or the asymmetric third token received by the receiving unit 201.

In still another possible example, the security parameter includes a digital signature or message authentication code. The receiving unit 201 is configured to receive the digital signature or the message authentication code sent by the control network element. The sending unit 202 is configured to send, to the second functional network element, the digital signature or the message authentication code received by the receiving unit 201.

In still another possible example, the receiving unit 201 is further configured to receive a first service change notification sent by the control network element, where the first service change notification is sent by the control network element when determining that a service change request sent by a management network element is valid.

In still another possible example, the receiving unit 201 is further configured to receive a service change request sent by the control network element, where the service change request includes a message authentication code or a digital signature that performs security protection on the service change request. The discovery apparatus 200 applied to the first functional network element further includes a processing unit 203, where the processing unit 203 is configured to verify correctness of the message authentication code or the digital signature included in the service change request received by the receiving unit 201.

When a form of hardware is used for implementation, the receiving unit 201 may be a receiver, the sending unit 202 may be a transmitter, and the processing unit 203 may be a processor. When the receiving unit 201 is a receiver, the sending unit 202 is a transmitter, and the processing unit 203 is a processor, the discovery apparatus 200 may use a structure of a first functional network element shown in FIG. 14. The first functional network element shown in FIG. 14 may be a first NF, and the first NF may be the first NF in the foregoing method embodiments.

Figure 14:
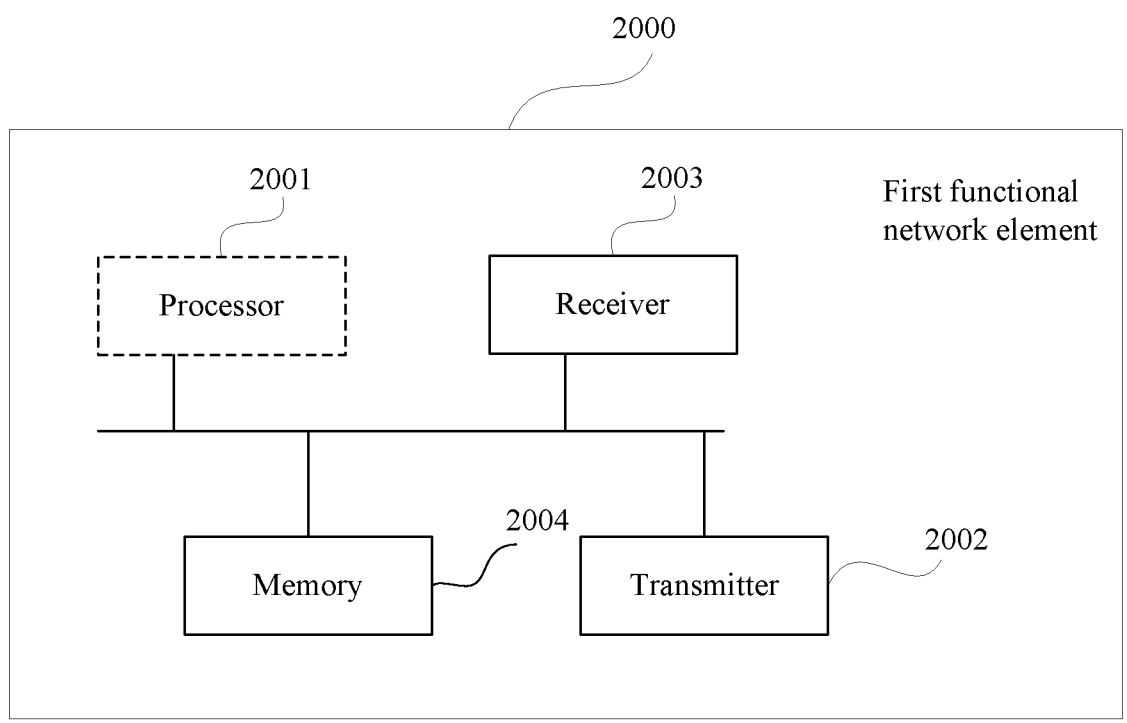
FIG. 14 is a schematic structural diagram of a first functional network element according to an embodiment of this application.

FIG. 14 is a schematic structural diagram of a first functional network element 2000 according to an embodiment of this application, that is, another schematic structural diagram of the discovery apparatus 200. Referring to FIG. 14, the first functional network element 2000 includes a processor 2001 and a transmitter 2002, and may further include a receiver 2003. The processor 2001 may alternatively be a controller. The processor 2001 is configured to support the first functional network element 2000 in implementing functions of the first functional network element in FIG. 2 to FIG. 10. The transmitter 2002 and the receiver 2003 are configured to support a function of sending and receiving messages between the first functional network element 2000 and a control network element and a second functional network element. The first functional network element 2000 may further include a memory 2004. The memory 2004 is configured to be coupled with the processor 2001, and the memory 2004 stores a program instruction and data necessary for the first functional network element 2000. The processor 2001, the transmitter 2002, the receiver 2003, and the memory 2004 are connected to each other. The memory 2004 is configured to store an instruction. The processor 2001 is configured to execute the instruction stored in the memory 2004, to control the transmitter 2002 and the receiver 2003 to send and receive data, and implement steps of implementing corresponding functions by the first functional network element in the foregoing methods.

In this embodiment of this application, for concepts, explanations, detailed descriptions, and other steps of the discovery apparatus 200 applied to the first functional network element and the first functional network element 2000 related to the technical solutions provided in the embodiments of this application, refer to descriptions about the content in the foregoing method embodiments or other embodiments. Details are not described herein again.

Figure 15:
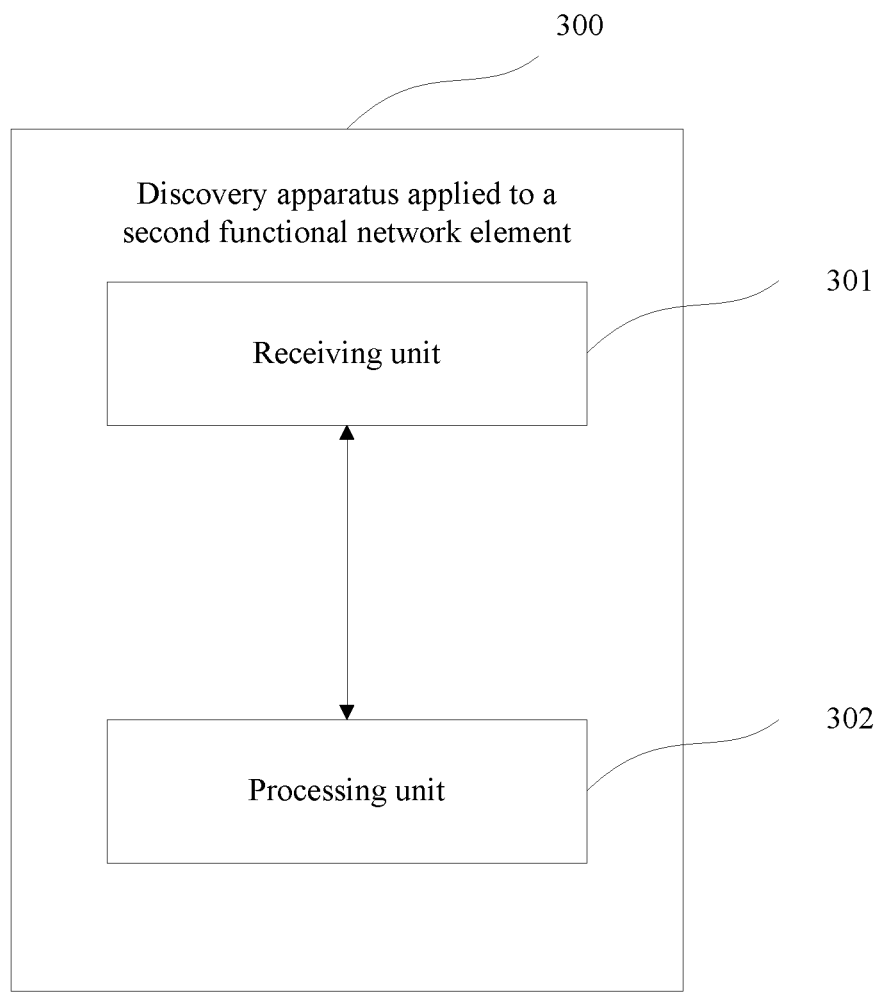
FIG. 15 is a schematic structural diagram of a discovery apparatus applied to a second functional network element according to an embodiment of this application.

When a form of a software functional unit is used for implementation, FIG. 15 is a schematic structural diagram of a discovery apparatus 300 based on a service-based architecture according to an embodiment of this application. The discovery apparatus 300 based on a service-based architecture may be applied to a second functional network element. Referring to FIG. 15, the discovery apparatus 300 applied to the second functional network element may include a receiving unit 301 and a processing unit 302. The receiving unit 301 is configured to receive an access request sent by a first functional network element, where the access request includes a security parameter. The processing unit 302 is configured to verify correctness of the security parameter received by the receiving unit 301, and determine, based on the correctness of the security parameter, whether the access request is authorized by the first functional network element.

In a possible example, the security parameter includes an asymmetric first token and a first session key that is shared between the first functional network element and the second functional network element. The receiving unit 301 is configured to receive the asymmetric first token sent by the first functional network element. The processing unit 302 is configured to decrypt, using a private key of the second functional network element, the asymmetric first token received by the receiving unit 301, to obtain a digital signature, and verify correctness of the digital signature using a public key of a control network element and signed content. The signed content includes an identifier of the first functional network element and the first session key.

In another possible example, the security parameter includes a symmetric first token and a first session key that is shared between the first functional network element and the second functional network element. The receiving unit 301 is configured to receive the symmetric first token sent by the first functional network element. The processing unit 302 is configured to decrypt, using the symmetric key, the symmetric first token received by the receiving unit 301, to obtain a message authentication code, and verify correctness of the message authentication code using the symmetric key shared between a control network element and the second functional network element and content protected by the message authentication code. The content protected by the message authentication code includes an identifier of the first functional network element and the first session key.

In still another possible example, the security parameter includes a second session key generated based on a service identifier of a service requested by the first functional network element, and an asymmetric second token generated based on the second session key. The receiving unit 301 is configured to receive the asymmetric second token sent by the first functional network element. The processing unit 302 is configured to decrypt, using a private key of the second functional network element, the asymmetric second token received by the receiving unit 301, to obtain a digital signature, and verify correctness of the digital signature using a public key of a control network element and signed content. The signed content includes an identifier of the first functional network element and the second session key.

In still another possible example, the security parameter includes a second session key separately generated based on a service identifier of a service requested by the first functional network element, and a symmetric second token generated based on the second session key. The receiving unit 301 is configured to receive the symmetric second token sent by the first functional network element. The processing unit 302 is configured to decrypt, using a symmetric key shared between a control network element and the second functional network element, the symmetric second token received by the receiving unit 301, to obtain a message authentication code, and verify correctness of the message authentication code using the symmetric key shared between the control network element and the second functional network element and content protected by the message authentication code. The content protected by the message authentication code includes an identifier of the first functional network element and the second session key.

In still another possible example, the security parameter includes a second session key generated based on a service identifier of each service requested by the first functional network element, and an asymmetric third token generated based on all second session keys. The receiving unit 301 is configured to receive the asymmetric third token sent by the first functional network element. The processing unit 302 is configured to decrypt, using a private key of the second functional network element, the third token received by the receiving unit 301, to obtain a digital signature, and verify correctness of the digital signature using a public key of a control network element and signed content. The signed content includes an identifier of the first functional network element and all the second session keys.

In still another possible example, the security parameter includes a second session key generated based on a service identifier of each service requested by the first functional network element, and a symmetric third token generated based on all second session keys. The receiving unit 301 is configured to receive the symmetric third token sent by the first functional network element. The processing unit 302 is configured to decrypt, using a symmetric key shared between a control network element and the second functional network element, the symmetric third token received by the receiving unit 301, to obtain a message authentication code, and verify correctness of the message authentication code using the symmetric key shared between the control network element and the second functional network element and content protected by the message authentication code. The content protected by the message authentication code includes an identifier of the first functional network element and all the second session keys.

In still another possible example, the security parameter includes a digital signature. The receiving unit 301 is configured to receive the digital signature sent by the first functional network element. The processing unit 302 is configured to verify, using a public key of a control network element and content that is signed by the digital signature, correctness of the digital signature received by the receiving unit 301. The content signed by the digital signature includes an identifier of the first functional network element.

In still another possible example, the security parameter includes a message authentication code. The receiving unit 301 is configured to receive the message authentication code sent by the first functional network element. The processing unit 302 is configured to verify correctness of the message authentication code using a symmetric key shared between a control network element and the second functional network element and content protected by the message authentication code, where the content protected by the message authentication code includes an identifier of the first functional network element.

When a form of hardware is used for implementation, the receiving unit 301 may be a transceiver, and the processing unit 302 may be a processor. When the receiving unit 301 is a receiver and the processing unit 302 is a processor, the discovery apparatus 300 may use a structure of a second functional network element shown in FIG. 16. The second functional network element shown in FIG. 16 may be a second NF, and the second NF may be the second NF in the foregoing method embodiments.

Figure 16:
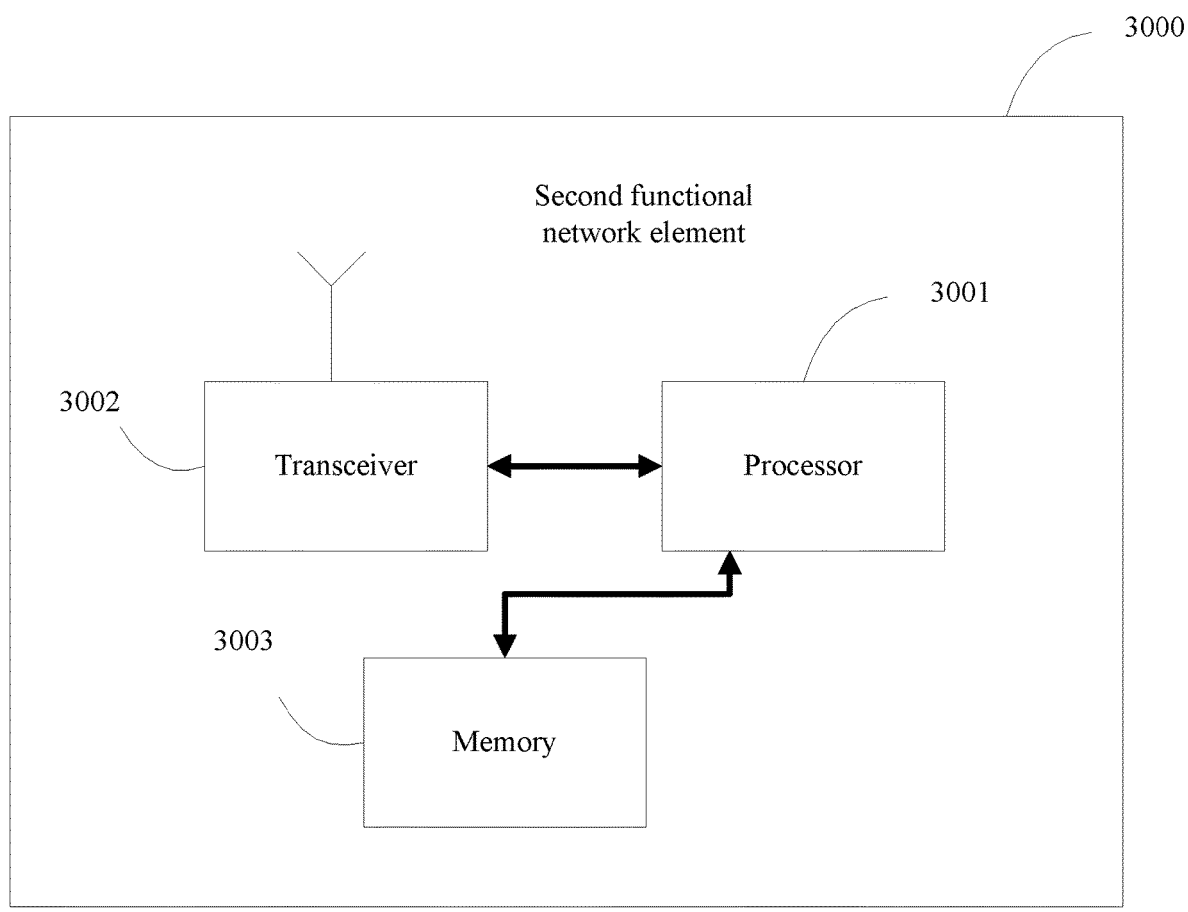
FIG. 16 is a schematic structural diagram of a second functional network element according to an embodiment of this application.

FIG. 16 is a schematic structural diagram of a second functional network element 3000 according to an embodiment of this application, that is, another schematic structural diagram of the discovery apparatus 300. Referring to FIG. 16, the second functional network element 3000 includes a processor 3001 and a transceiver 3002. The processor 3001 may alternatively be a controller. The processor 3001 is configured to support the second functional network element 3000 in implementing functions of the second functional network element in FIG. 2 to FIG. 10. The transceiver 3002 is configured to support a function of sending and receiving messages between the second functional network element 3000 and a first functional network element. The second functional network element 3000 may further include a memory 3003. The memory 3003 is configured to be coupled with the processor 3001, and the memory 3000 stores a program instruction and data necessary for the second functional network element 3000. The processor 3001, the transceiver 3002, and the memory 3003 are connected to each other. The memory 3003 is configured to store an instruction. The processor 3001 is configured to execute the instruction stored in the memory 3003, to control the transceiver 3002 to send and receive data, and implement steps of implementing corresponding functions by the control network element in the foregoing methods.

In this embodiment of this application, for concepts, explanations, detailed descriptions, and other steps of the discovery apparatus 300 and the second functional network element 3000 related to the technical solutions provided in the embodiments of this application, refer to descriptions about the content in the foregoing method embodiments or other embodiments. Details are not described herein again.

It should be noted that the foregoing related processor in the embodiments of this application may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor (DSP) and a microprocessor.

The memory may be integrated into the processor or may be disposed separate from the processor.

In an implementation, functions of the receiver and the transmitter may be implemented using a transceiver circuit or a dedicated transceiver chip. The processor may be implemented using a dedicated processing chip, a processing circuit, a processor, or a general-purpose chip.

In another implementation, program code for implementing functions of the processor, the receiver, and the transmitter is stored in the memory, and a general-purpose processor executes the code in the memory to implement the functions of the processor, the receiver, and the transmitter.

According to the methods provided in the embodiments of this application, an embodiment of this application further provides a communications system, where the communications system includes the foregoing first functional network element, second functional network element, and control network element.

An embodiment of this application further provides a chip. The chip is connected to a memory, and is configured to read and execute a software program stored in the memory, to implement functions of the first functional network element, the second functional network element, or the control network element in the foregoing embodiment.

An embodiment of this application further provides a computer storage medium. The computer storage medium stores some instructions. When these instructions are executed, the discovery method in the foregoing method embodiments can be implemented.

An embodiment of this application further provides a computer program product. The computer program product includes a computer program. The computer program is used to perform the discovery method in the foregoing method embodiments.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a magnetic disk storage, a compact disc (CD) read-only memory (CD-ROM), an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or the other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

The invention claimed is:

1. An authentication system based on a service-based architecture, wherein the authentication system comprises:
a second control network element that belongs to a second public land mobile network (PLMN), wherein the second control network element comprises at least one first processor coupled to at least one first memory storing instructions and configured to execute the instructions to cause the second control network element to:
obtain a security parameter by performing, based on a key, a preset algorithm on an identifier of a first network function (NF) network element in the authentication system, an identifier of the second control network element, a service identifier of a service requested by the first NF network element, an identifier of a first PLMN, and an identifier of the second PLMN, wherein the preset algorithm is a digital signature algorithm, wherein the security parameter is digitally signed using the digital signature algorithm, and wherein the first NF network element belongs to the first PLMN; and
send the security parameter to the first NF network element; and
a second NF network element that belongs to the second PLMN, wherein the second NF network element comprises at least one second processor coupled to at least one second memory storing instructions and configured to execute the instructions to cause the second NF network element to:
receive the security parameter from the first NF network element;
verify correctness of the security parameter; and
permit the first NF network element to access the second NF network element when the second NF network element verifies that the security parameter is correct.

2. The authentication system according to claim 1, wherein the second NF network element is further configured to refuse to permit the first NF network element to access the second NF network element when the second NF network element verifies that the security parameter is incorrect.

3. The authentication system according to claim 1, wherein the second control network element is further configured to send the security parameter to the first NF network element via a first control network element that belongs to the first PLMN.

4. The authentication system according to claim 1, wherein the key is a private key of the second control network element.

5. The authentication system according to claim 1, wherein the key is a symmetric key shared between the second control network element and the second NF network element, and wherein the security parameter is a message authentication code.

6. The authentication system according to claim 1, wherein the second control network element is further configured to receive, via a first control network element that belongs to the first PLMN, a discovery request from the first NF network element before obtaining the security parameter.

7. A discovery method based on a service-based architecture, the discovery method comprising:

obtaining, by a second control network element that belongs to a second public land mobile network (PLMN), a security parameter by performing, based on a key, a preset algorithm on an identifier of a first network function (NF) network element in an authentication system, an identifier of the second control network element, a service identifier of a service requested by the first NF network element, an identifier of a first PLMN, and an identifier of the second PLMN, wherein the preset algorithm is a digital signature algorithm, wherein the security parameter is digitally signed using the digital signature algorithm, and wherein the first NF network element belongs to the first PLMN;

sending, by the second control network element, the security parameter to the first NF network element;

receiving, by a second NF network element that belongs to the second PLMN, the security parameter from the first NF network element;

verifying, by the second NF network element, correctness of the security parameter; and permitting, by the second NF network element, the first NF network element to access the second NF network element when the second NF network element verifies that the security parameter is correct.

8. The discovery method according to claim 7, further comprising refusing, by the second NF network element, to permit the first NF network element to access the second NF network element when the second NF network element verifies that the security parameter is incorrect.

9. The discovery method according to claim 7, wherein sending the security parameter to the first NF network element comprises sending, by the second control network element, the security parameter to the first NF network element via a first control network element that belongs to the first PLMN.

10. The discovery method according to claim 7, wherein the key is a private key of the second control network element, and wherein the security parameter is a digital signature.

11. The discovery method according to claim 7, wherein the key is a symmetric key shared between the second control network element and the second NF network element, and wherein the security parameter is a message authentication code.

12. The discovery method according to claim 7, further comprising receiving, by the second control network element via a first control network element that belongs to the first PLMN, a discovery request from the first NF network element before obtaining the security parameter.

13. A discovery method based on a service-based architecture, comprising:

obtaining, by a second control network element that belongs to a second public land mobile network (PLMN), a security parameter by performing, based on a key, a preset algorithm on an identifier of a first network function (NF) network element in an authentication system, an identifier of the second control network element, a service identifier of a service requested by the first NF network element, an identifier of a first PLMN, and an identifier of the second PLMN, wherein the preset algorithm is a digital signature algorithm, wherein the security parameter is digitally signed using the digital signature algorithm, and wherein the first NF network element belongs to the first PLMN; and sending, by the second control network element, the security parameter to the first NF network element.

14. The discovery method according to claim 13, wherein sending the security parameter to the first NF network element comprises sending, by the second control network element, the security parameter to the first NF network element via a first control network element that belongs to the first PLMN.

15. The discovery method according to claim 13, wherein the key is a private key of the second control network element, and wherein the security parameter is a digital signature.

16. The discovery method according to claim 13, wherein the key is a symmetric key shared between the second control network element and a second NF network element, and wherein the security parameter is a message authentication code.

17. A second control network element, comprising:

at least one processor coupled to at least one memory storing instructions and configured to execute the instructions to cause the second control network element to:

obtain a security parameter by performing, based on a key, a preset algorithm on an identifier of a first network function (NF) network element, an identifier of the second control network element, a service identifier of a service requested by the first NF network element, an identifier of a first public land mobile network (PLMN) to which the first NF network element belongs, and an identifier of a second PLMN to which a second NF network element belongs, wherein the preset algorithm is a di its al signature algorithm, wherein the security parameter is digitally signed using the digital signature algorithm, and wherein the second NF network element is configured to provide the service requested by the first NF network element; and send the security parameter to the first NF network element.

18. The second control network element according to claim 17, wherein the instructions further cause the second control network element to send the security parameter to the first NF network element via a first control network element that belongs to the first PLMN.

19. The second control network element according to claim 17, wherein the key is a private key of the second control network element, and wherein the security parameter is a digital signature.

20. The second control network element according to claim 17, wherein the key is a symmetric key shared between the second control network element and the second NF network element, and wherein the security parameter is a message authentication code.

* * * * *

UNITED STATES PATENT AND TRADEMARK OFFICE
CERTIFICATE OF CORRECTION

| | |
|---|---|
| PATENT NO. | : 11,824,981 B2 |
| APPLICATION NO. | : 17/696093 |
| DATED | : November 21, 2023 |
| INVENTOR(S) | : Bo Zhang et al. |

It is certified that error appears in the above-identified patent and that said Letters Patent is hereby corrected as shown below:

In the Claims

Claim 17, Column 46, Line 38: "belongs, wherein the preset algorithm is a di its al" should read "belongs, wherein the preset algorithm is a digital"

Signed and Sealed this
Ninth Day of January, 2024

Katherine Kelly Vidal
*Director of the United States Patent and Trademark Office*